(12) United States Patent
Kaifu

(10) Patent No.: US 8,743,297 B2
(45) Date of Patent: Jun. 3, 2014

(54) LIQUID CRYSTAL LIGHT ADJUSTING DEVICE AND IMAGING APPARATUS

(75) Inventor: Keita Kaifu, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 13/137,895

(22) Filed: Sep. 21, 2011

(65) Prior Publication Data

US 2012/0105743 A1 May 3, 2012

(30) Foreign Application Priority Data

Oct. 29, 2010 (JP) ................. 2010-243257

(51) Int. Cl.
*G02F 1/13* (2006.01)
*G02B 26/00* (2006.01)

(52) U.S. Cl.
USPC ............................... 349/2; 359/237

(58) Field of Classification Search
CPC ............ G02F 1/134309; G02F 1/133615; G02F 1/133553; G02F 1/133707; G02F 1/133605; G02B 27/2214
USPC .......................................... 349/15, 113, 129
See application file for complete search history.

(56) References Cited

U.S. PATENT DOCUMENTS

| 6,961,089 B2 * | 11/2005 | Kubo ....................... 348/333.01 |
| 7,352,416 B2 * | 4/2008 | Hirota et al. ...................... 349/5 |
| 2003/0142247 A1 * | 7/2003 | Nishiyama et al. ............ 349/67 |
| 2004/0227883 A1 * | 11/2004 | Lee et al. ...................... 349/129 |
| 2009/0128746 A1 * | 5/2009 | Kean et al. ...................... 349/96 |
| 2009/0207341 A1 * | 8/2009 | Shinkai et al. ................... 349/65 |
| 2009/0262289 A1 * | 10/2009 | Koma et al. ................... 349/129 |
| 2011/0069267 A1 * | 3/2011 | Moon et al. ................... 349/127 |

FOREIGN PATENT DOCUMENTS

JP 09-305092 * 11/1997

* cited by examiner

*Primary Examiner* — Bumsuk Won
*Assistant Examiner* — Ryan Crockett
(74) *Attorney, Agent, or Firm* — Rader, Fishman & Grauer PLLC

(57) ABSTRACT

A liquid crystal light adjusting device includes: a first liquid crystal layer on which light from one surface is incident; and a reflective film which reflects light transmitted through the first liquid crystal layer, wherein the first liquid crystal layer has adjacent alignment regions, and orientation directions of liquid crystal molecules in the adjacent alignment regions are different.

22 Claims, 20 Drawing Sheets

U.S. 8,743,297 B2

LIQUID CRYSTAL LIGHT ADJUSTING DEVICE AND IMAGING APPARATUS

FIELD

The present disclosure relates to a liquid crystal light adjusting device which performs light modulation using liquid crystal and an imaging apparatus including such a liquid crystal light adjusting device.

BACKGROUND

Many kinds of electric light adjusting devices which reflect light according to the level of a voltage applied from the outside have been proposed (for example, JP-A-9-305092). Among them, a liquid crystal light adjusting device has been drawing attention since the structure or the control method is simple.

The liquid crystal light adjusting device is mainly formed by a polarizing plate and guest-host (GH) cells including liquid crystal molecules and dichroic dye molecules (coloring matter). Light transmitted through the polarizing plate is incident on the guest-host cells. In this case, the amount of light transmission at the emission side is relatively large (light transmittance is high) if the angle between the long axis direction of a liquid crystal molecule and the light traveling direction is small, and the amount of light transmission at the emission side is relatively small (light transmittance is low) if the angle between the long axis direction of a liquid crystal molecule and the light traveling direction is close to the right angle.

In addition, liquid crystal molecules are largely divided into two types of positive and negative types. In the case of a negative type liquid crystal molecule, the optical axis direction and the long axis direction of the liquid crystal molecule become parallel when no voltage is applied, and the optical axis direction and the long axis direction of the liquid crystal molecule become perpendicular to each other when a voltage is applied. Dichromatic dye molecules are arrayed in the same direction as liquid crystal molecules. Accordingly, when the negative type liquid crystal molecule is used as a host, the light transmittance is relatively high (bright) when no voltage is applied, and the light transmittance is relatively low (dark) when a voltage is applied.

On the other hand, in the case of a positive type liquid crystal molecule, the arrangement of liquid crystal molecules when no voltage is applied and the arrangement of liquid crystal molecules when a voltage is applied are opposite those in the case of a negative type liquid crystal molecule. Accordingly, when the positive type liquid crystal molecule is used as a host, the light transmittance is relatively low (dark) when no voltage is applied, and the light transmittance is relatively high (bright) when a voltage is applied.

SUMMARY

Meanwhile, in such a light adjusting device, a light adjustment range (dynamic range) indicating a light transmittance difference (degree of light shielding) should be wide since the light adjusting device is applied to various kinds of electronic apparatuses, such as an imaging apparatus.

However, the light adjustment range of the liquid crystal light adjusting device up to now is not sufficient, and the research and development for extending the light adjustment range further have not been made actively.

In view of the above, it is desirable to provide a liquid crystal light adjusting device having a wide light adjustment range and an imaging apparatus using this liquid crystal light adjusting device.

An embodiment of the present disclosure is directed to a liquid crystal light adjusting device including: a first liquid crystal layer on which light from one surface is incident; and a reflective film which reflects light transmitted through the first liquid crystal layer. The first liquid crystal layer has adjacent alignment regions, and orientation directions of liquid crystal molecules in the adjacent alignment regions are different.

In the liquid crystal light adjusting device according to the embodiment of the present disclosure, orientation directions of liquid crystal molecules in alignment regions through which light, which is incident from the one surface of the liquid crystal layer, and light, which is reflected by the reflective film and is transmitted through the liquid crystal layer again, are transmitted are different at least partially.

Another embodiment of the present disclosure is directed to an imaging apparatus including the liquid crystal light adjusting device described above. Light adjustment is made by the liquid crystal light adjusting device to perform imaging.

According to the liquid crystal light adjusting device and the imaging apparatus according to the embodiments of the present disclosure, the reflective film which reflects light transmitted through the first liquid crystal layer is provided and the liquid crystal layer has alignment regions with different orientation directions of liquid crystal molecules. Therefore, both the angle between the long axis direction of a molecule and the traveling direction of light incident from one surface of the liquid crystal layer and the angle between the long axis direction of a molecule and the traveling direction of light reflected from the reflective film can be controlled. As a result, the light adjustment range of the liquid crystal light adjusting device can be extended.

BRIEF DESCRIPTION OF THE DRAWINGS

FIG. 30 is a view for explaining another example of the rubbing direction in the alignment film of the liquid crystal light adjusting device shown in FIG. 5 and the like.

DETAILED DESCRIPTION

Hereinafter, embodiments of the present disclosure will be described in detail with reference to the accompanying drawings. In addition, the explanation will be given in following order.

1. First embodiment (example of a liquid crystal light adjusting device having alignment regions with different orientation directions of liquid crystal molecules)

2. Modifications (Modifications related to the direction of rubbing processing)

3. Second embodiment (example of a liquid crystal light adjusting device in which a plurality of liquid crystal layers are laminated)

First Embodiment

[The Entire Configuration of an Imaging Apparatus 1]

Figure 1:
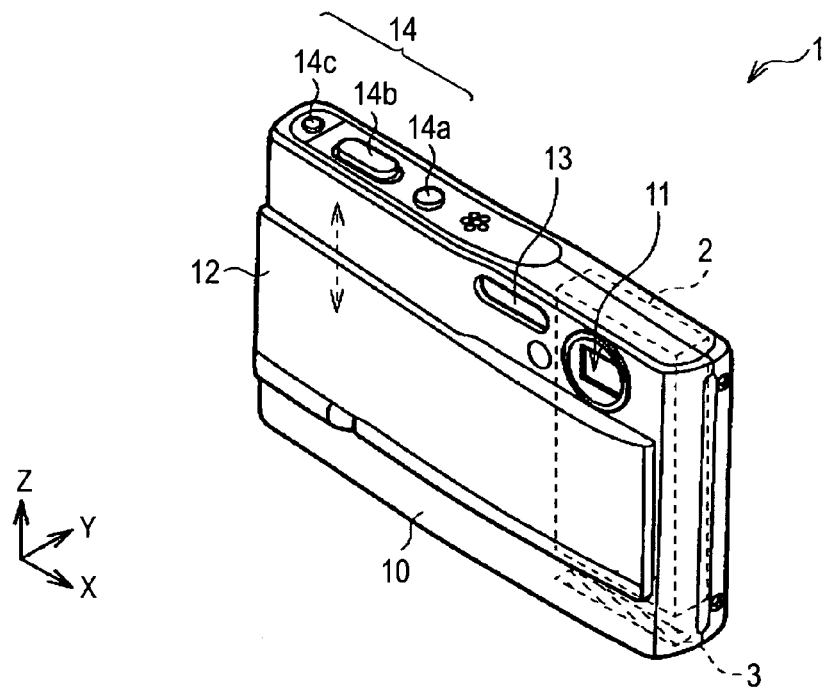
FIG. 1 is a perspective view showing an example of the appearance configuration of an imaging apparatus in an application example of the present disclosure.

FIG. 1 is a perspective view showing the entire configuration (appearance configuration) of an imaging apparatus (imaging apparatus 1) to which a liquid crystal light adjusting device (liquid crystal light adjusting device 26 to be described later) according to the first embodiment of the present disclosure is applied. The imaging apparatus 1 is a digital camera (digital still camera) which converts an optical image from a subject into an electric signal using an imaging device (imaging device 3 to be described later). In addition, an imaging signal (digital signal) acquired in this way may be recorded on a semiconductor recording medium (not shown) or may be displayed on a display device (not shown), such as a liquid crystal display.

In the imaging apparatus 1, a lens unit 11, a lens cover 12, a flash 13, and an operation button 14 are provided on a main body (housing) 10. Specifically, the lens unit 11, the lens cover 12, and the flash 13 are disposed on the front surface (Z-X plane) of the main body 10, and the operation button 14 is disposed on the top surface (X-Y plane) of the main body 10. In addition, in the imaging apparatus 1, a lens barrel device 2 including the above-described lens unit 11, the imaging device 3, and a control processing unit (not shown) are provided in the main body 10. In addition to those described above, for example, a battery, a microphone, a speaker, and the like (not shown) are provided in the main body 10.

Figure 2:
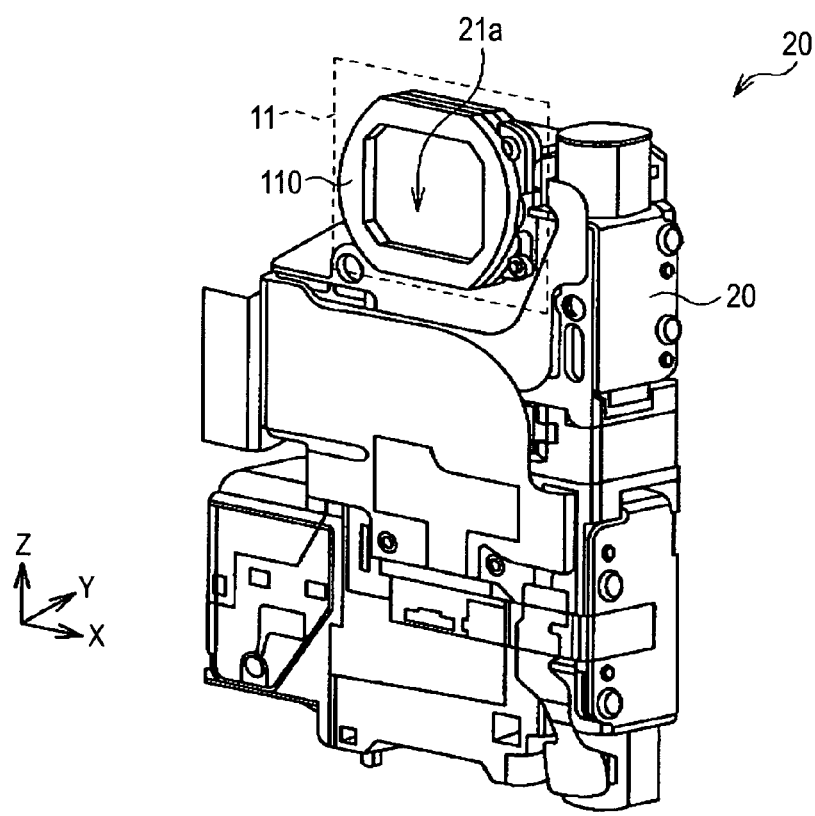
FIG. 2 is a perspective view showing an example of the appearance configuration of a lens barrel device shown in FIG. 1.
Figure 3:
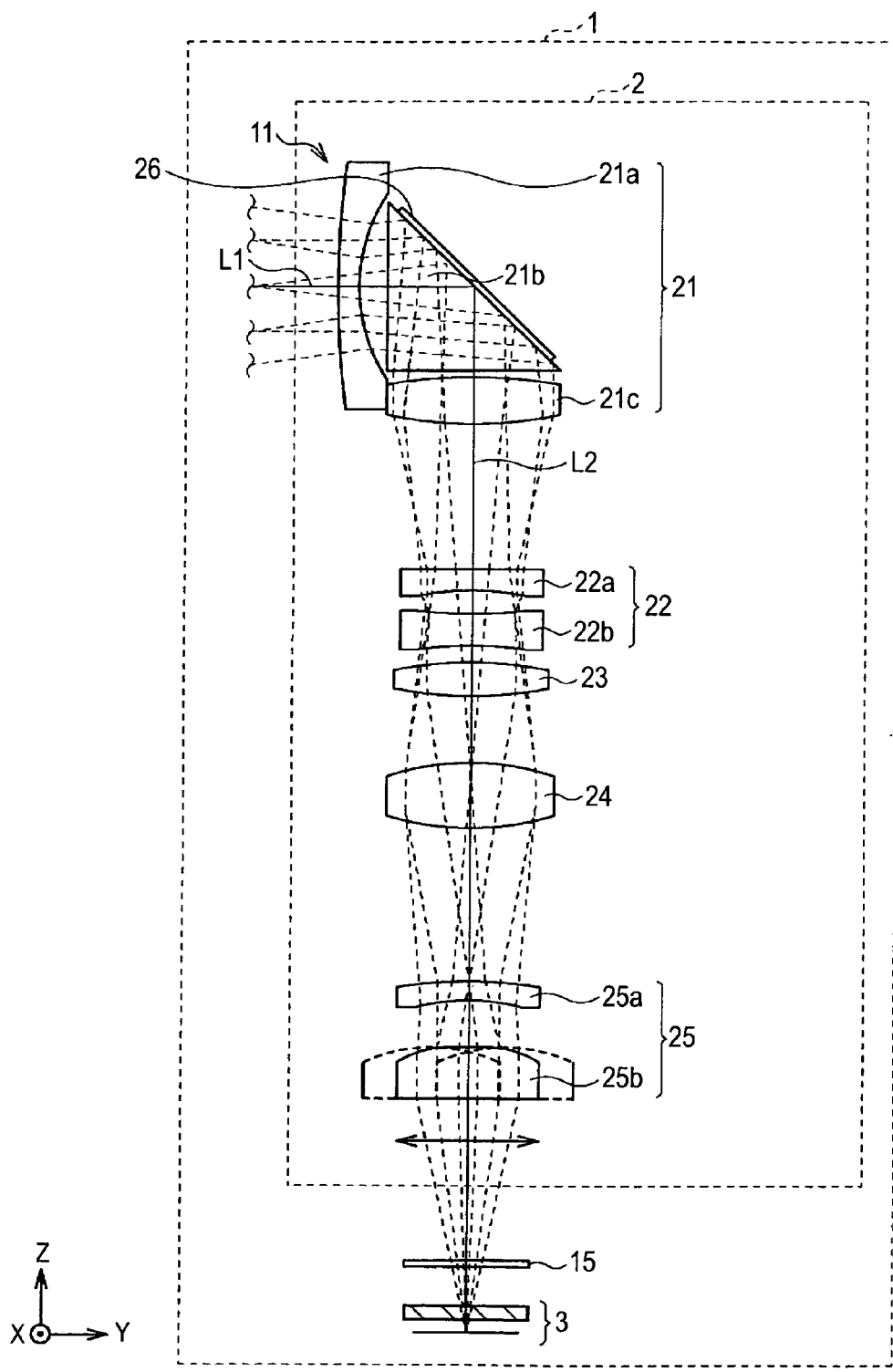
FIG. 3 is a view showing an example of the configuration of an optical system in the lens barrel device shown in FIG. 1.
Figure 4:
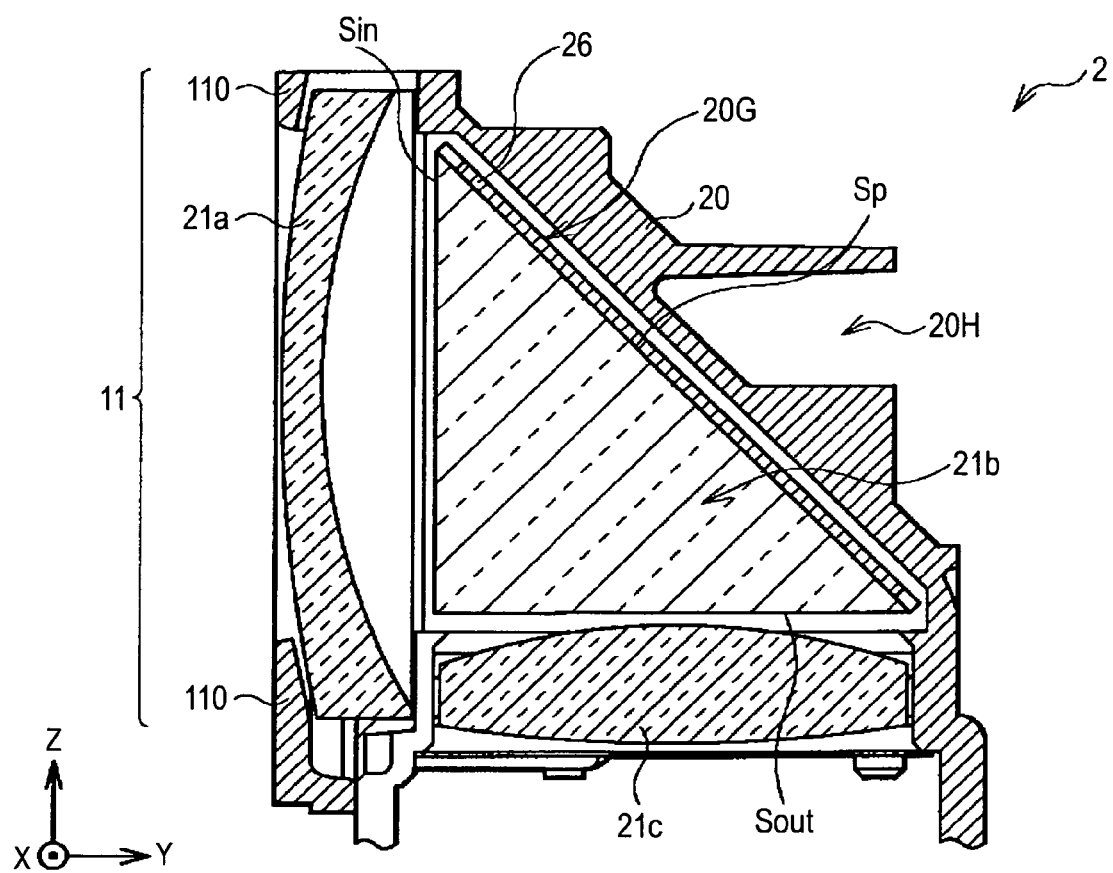
FIG. 4 is an enlarged sectional view showing a part of the lens barrel device, shown in FIG. 3.
Figure 5:
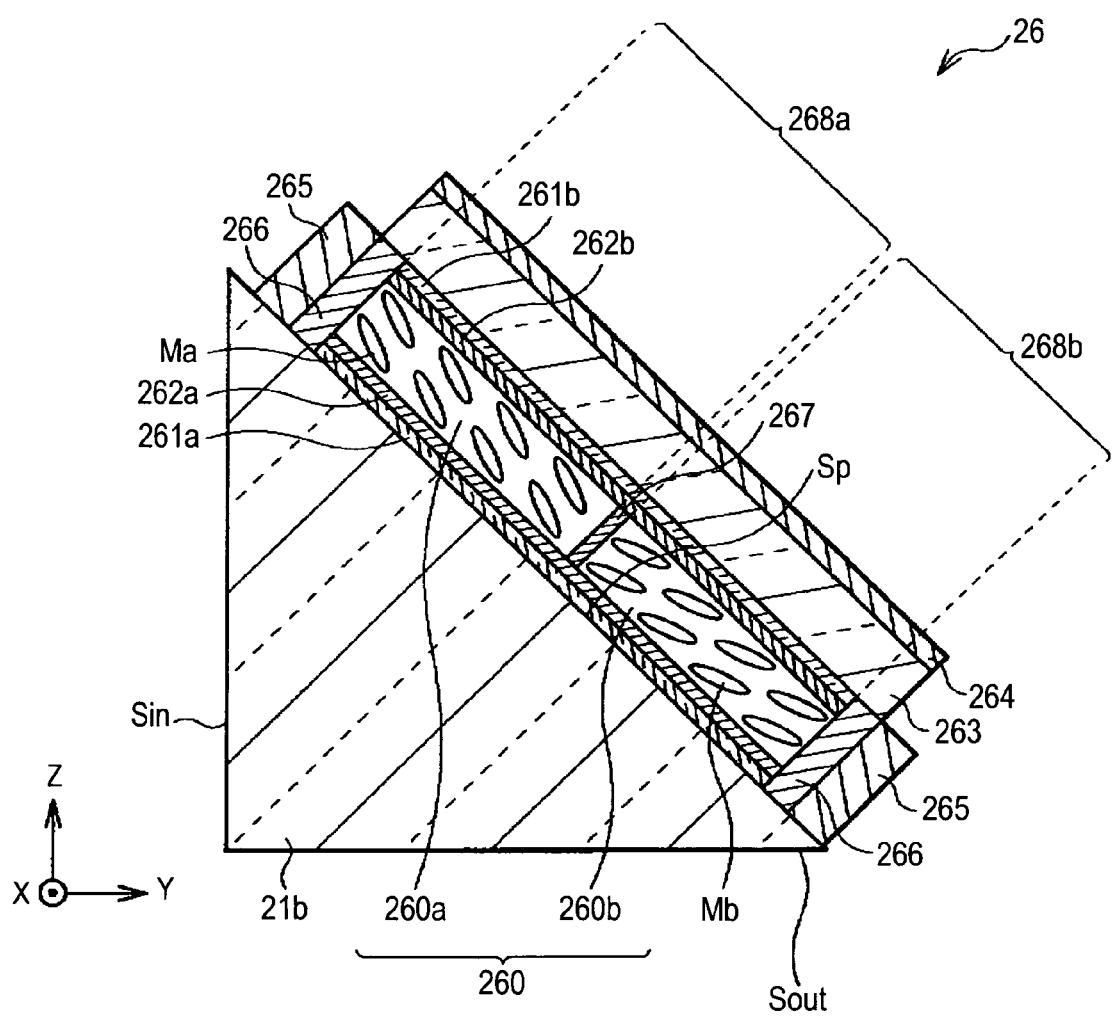
FIG. 5 is a sectional view of a liquid crystal light adjusting device according to a first embodiment of the present disclosure.

The lens barrel device 2 is a so-called bending type lens barrel device which makes imaging light, which is incident as will be described later, emitted by bending the optical path. Thus, it is possible to make the lens barrel device 2 thin (thin in the Y-axis direction). For example, the lens barrel device 2 has an appearance configuration shown in FIG. 2. That is, in the lens barrel device 2, the lens unit 11 is disposed in an upper portion (end in a positive direction on the Z axis) of a lens barrel member 20. This lens unit 11 includes a lens 21a as an objective lens, which will be described later, and a front frame 110 which forms a part of the main body 10. In addition, the liquid crystal light adjusting device 26 is disposed in the lens barrel device 2. The detailed configuration of each of the lens barrel device 2 and the liquid crystal light adjusting device 26 will be described later (FIGS. 3 to 5).

The imaging device 3 is a device which detects imaging light emitted from the lens barrel device 2 to acquire an imaging signal. For example, the imaging device 3 is formed using an imaging sensor, such as a CCD (Charge Coupled Device) or a CMOS (Complementary Metal Oxide Semiconductor).

The lens cover 12 is a member for protecting the lens unit 11 from the outside. As shown by the dotted arrow in the drawing, the lens cover 12 can move along the Z-axis direction. Specifically, when imaging a subject, the lens cover 12 is disposed below the lens unit 11 so that the lens unit 11 is exposed to the outside. On the other hand, other than when imaging a subject, the lens cover 12 is disposed above the lens unit 11 so that the lens unit 11 is not exposed to the outside.

Here, the operation button 14 includes a power button 14a for ON/OFF of the imaging apparatus 1, a recording button 14b (shutter button) for executing the imaging of a subject, and a shaking setup button 14c for executing predetermined image blurring correction on an imaging signal. In addition to these buttons (instead of these buttons), buttons used to perform other operations may be provided on the main body 10.

[Detailed Configuration of the Lens Barrel Device 2]

Next, the detailed configuration of the lens barrel device 2 will be described with reference to FIGS. 3 to 5. FIG. 3 shows an example of the configuration of an optical system in the lens barrel device 2 together with the imaging device 3 and the like. FIG. 4 is an enlarged sectional view (Y-Z sectional view) showing a part of the lens barrel device 2 shown in FIG. 3.

As shown in FIG. 3, the lens barrel device 2 includes five lens groups (first to fifth lens groups 21 to 25) and the liquid crystal light adjusting device 26 (light adjusting device). Among these five lens groups, the first lens group 21 is disposed on the optical axis L1 along the Y axis and on the optical axis L2 along the Z axis, and the second to fifth lens groups 22 to 25 are disposed on the optical axis L2. In addition, the second to fifth lens groups 22 to 25 are disposed sequentially from the first lens group 21 side on the optical path between the first lens group 21 (liquid crystal light adjusting device 26) and the imaging device 3. In addition, a predetermined optical film 15 is disposed between the lens barrel device 2 and the imaging device 3 (between the fifth lens group 25 (lens 25b to be described later) and the imaging device 3).

The first lens group 21 includes the lens 21a disposed on the optical axis L1, a prism 21b, and a lens 21c disposed on the optical axis L2. The lens 21a is a lens functioning as an objective lens as described above, and imaging light of a subject is incident on the lens 21a. The prism 21b is disposed in a bending region (bending region of the optical path of imaging light) within the lens barrel device 2, and its shape is a triangular prism shape having an incidence surface (Z-X plane) and the emission plane (X-Y plane) of imaging light and a mounting surface (formation surface or reflective surface) of the liquid crystal light adjusting device 26, which will be described later. That is, the prism 21b is a rectangular prism which emits imaging light, which is incident along the optical axis L1, along the optical axis L2 after bending the optical path. As a result, the lens barrel device 2 functions as the bending type lens barrel device described above. The lens 21c is a lens disposed at the emission surface side of the prism 21b. In addition, the lens 21a is disposed at the incidence surface side of the prism 21b.

The second lens group 22 includes two lenses 22a and 22b disposed on the optical axis L2. Each of the lenses 22a and 22b can move in a wide direction (wide angle direction) and in a tele direction on the optical axis L2, for example.

The third lens group 23 includes one lens herein, and is fixed in the lens barrel device 2.

The fourth lens group 24 includes one lens herein, and can move on the optical axis L2. The lens which forms the fourth lens group 24 is a lens (focus lens) used to adjust a focal distance (used for focusing).

The fifth lens group 25 includes two lenses 25a and 25b disposed on the optical axis L2. The lens 25a is fixed in the lens barrel device 2, while the lens 25b (correction lens) is configured to be able to move in the Y-axis direction as shown by the arrow and dotted lines in the drawing.

The second and fourth lens groups 22 and 24 can move in the tele direction and the wide direction along the optical axis L2 independently of each other. By movement of the second and fourth lens groups 22 and 24 in the tele direction or in the wide direction, zooming adjustment and focusing adjustment are made. That is, at the time of zooming, the second and fourth lens groups 22 and 24 move from the wide (wide angle) side to the tele side such that zooming adjustment is made. In addition, at the time of focusing, the fourth lens group 24 moves from the wide side to the tele side such that focusing adjustment is made.

(Liquid Crystal Light Adjusting Device 26)

The liquid crystal light adjusting device 26 is a device which adjusts the amount of imaging light (light adjusting device), and performs light amount adjustment (light adjustment) electrically using liquid crystal. As shown in FIG. 3, the liquid crystal light adjusting device 26 is disposed in the above-described bending region of the optical path of imaging light.

Specifically, as shown in FIG. 4, the liquid crystal light adjusting device 26 is disposed (formed) on a mounting surface Sp of the prism 21b which has an incidence surface Sin, an emission surface Sout, and the mounting surface Sp. More specifically, the liquid crystal light adjusting device 26 is disposed in a gap section (gap region) 20G between the lens, barrel member 20 and the prism 21b (mounting surface Sp), that is, in a gap therebetween or a space region therebetween. Moreover, as shown in FIG. 4, at the back surface side (mounting surface Sp side) of the prism 21b in the lens barrel member 20, a positioning hole 20H (boss hole) used when fixing the lens barrel device 2 to the main body 10 of the imaging apparatus 1 is formed along the Y-axis direction.

FIG. 5 is a schematic view showing an example of the detailed sectional configuration (an example of the configuration of the Y-Z section) of the liquid crystal light adjusting device 26 together with the prism 21b. The liquid crystal light adjusting device 26 has a laminated structure in which a transparent electrode 261a, an alignment film 262a, a liquid crystal layer 260, an alignment film 262b, a transparent electrode 261b, a transparent substrate 263 (substrate), and a reflective film 264 are disposed in this order from the prism 21b side. That is, the prism 21b is provided at one surface side of the liquid crystal layer 260, and the transparent substrate 263 and the reflective film 264 are provided in this order at the other surface side. The liquid crystal layer 260 (first liquid crystal layer) is formed by the liquid crystal layer 260a and the liquid crystal layer 260b divided by a partition member 267. Regions where the liquid crystal layers 260a and 260b are disposed are assumed to be alignment regions 268a and 268b, respectively. In addition, sealant 265, a spacer 266, and an encapsulation section (not shown) are provided in the liquid crystal light adjusting device 26.

The liquid crystal layer 260 is a layer containing liquid crystal molecules. Here, the liquid crystal layer 260 is configured to contain not only liquid crystal molecules but also predetermined dichroic dye molecules (in FIG. 5, a liquid crystal molecule and a dichroic dye molecule are collectively shown as "molecules Ma and Mb" for simplification of illustration). That is, the liquid crystal light adjusting device 26 is formed using guest-host liquid crystal containing a dichroic coloring matter.

Although the liquid crystal layer 260 may be formed by either positive type liquid crystal molecules or negative type liquid crystal molecules in the present embodiment, the case where the liquid crystal layer 260 is formed by negative type liquid crystal molecules will be representatively described below. Generally, in the case of liquid crystal molecules for application to the VA (Vertical Alignment) method which is representative negative type liquid crystal, rubbing processing is not performed on the alignment film. In the present embodiment, however, the rubbing processing is performed on the alignment film so that the orientation direction of liquid crystal molecules is controlled.

It is preferable that the liquid crystal layer 260 be formed using liquid crystal with approximately the same (preferably, the same) light refractive index as the prism 21b. This is because imaging light is refracted (reflected) on the interface between the prism 21b and the liquid crystal light adjusting device 26 (liquid crystal layer 260) and shifting of the optical path of imaging light from the optical axes L1 and L2 is prevented. In addition, from the following reasons, it is not necessary to take into consideration substantially the influence of light refractive indices of other members (the transparent electrodes 261a and 261b, the alignment films 262a and 262b, and the like) in the liquid crystal light adjusting device 26. The first reason is that the thickness of each of these members is very small (tens of nanometers to hundreds of nanometers). Another reason is that the light refractive indices of the alignment films 262a and 262b are generally set to be approximately the same as the light refractive index of the liquid crystal layer 260 and the light refractive indices of the transparent electrodes 261a and 261b can be easily adjusted by adjusting the thicknesses of the alignment films 262a and 262b.

In the present embodiment, the liquid crystal layer 260 includes the liquid crystal layers 260a and 260b as described above. The liquid crystal layers 260a and 260b contain molecules Ma and Mb, respectively. The molecules Ma and Mb are the same type liquid crystal molecules and dichroic dye molecules, but the orientation directions (inclination directions) of the molecules Ma and Mb are different. Regions where the liquid crystal layers 260a and 260b are disposed are assumed to be alignment regions 268a and 268b, respectively.

Figure 6A:
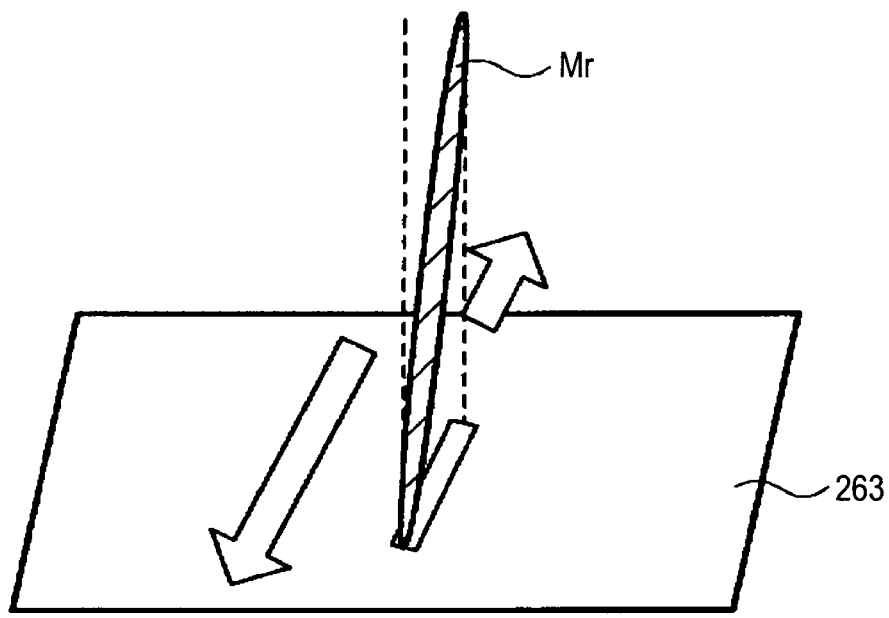
FIGS. 6A and 6B are views for explaining the pretilt of a liquid crystal molecule.
Figure 6B:
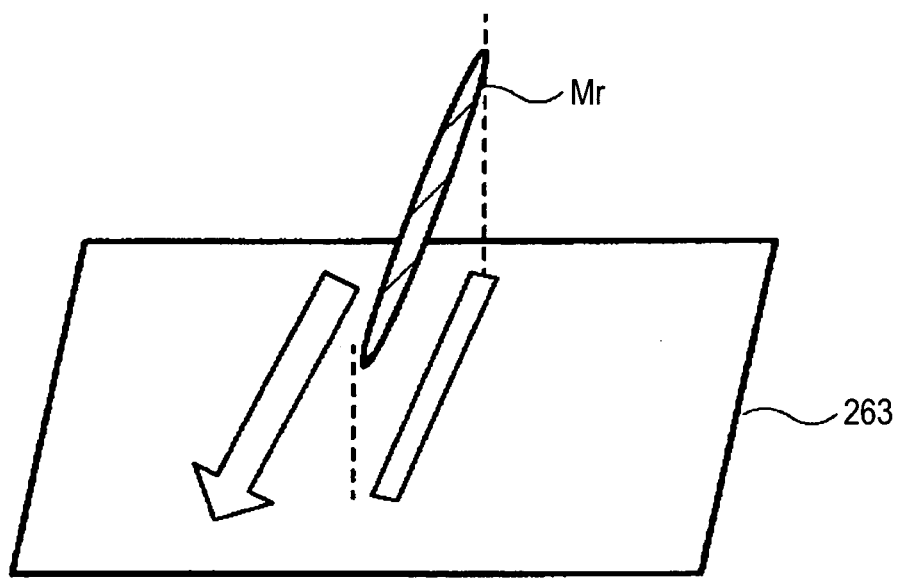

Here, a method of controlling the orientation direction will be described using FIGS. 6A and 6B. FIG. 6A shows the relationship between the liquid crystal molecule Mr and the substrate 263 when no voltage is applied, and FIG. 6B shows the relationship between the liquid crystal molecule Mr and the substrate 263 when a voltage is applied. Generally, an angle between the long axis direction of a liquid crystal molecule and a substrate interface (alignment film), a so-called pretilt angle is controlled by rubbing processing on the alignment film. By performing such rubbing processing, the liquid crystal molecule Mr is inclined in a direction determined by the rubbing processing as shown in FIG. 6B, from a state where the liquid crystal molecule Mr and the substrate 263 are approximately perpendicular to each other as shown in FIG. 6A, when a voltage is applied.

As described above, the alignment film 262a (first alignment film) and the alignment film 262b (second alignment film) are films for making the molecules Ma and Mb in the liquid crystal layers 260a and 260b aligned in desired directions (orientation directions). Each of the alignment films 262a and 262b is formed of a polymer material, such as polyimide, or an inorganic material. The orientation direction of a liquid crystal molecule is set by performing rubbing processing in a predetermined direction on the alignment films 262a and 262b in advance.

Figure 7:
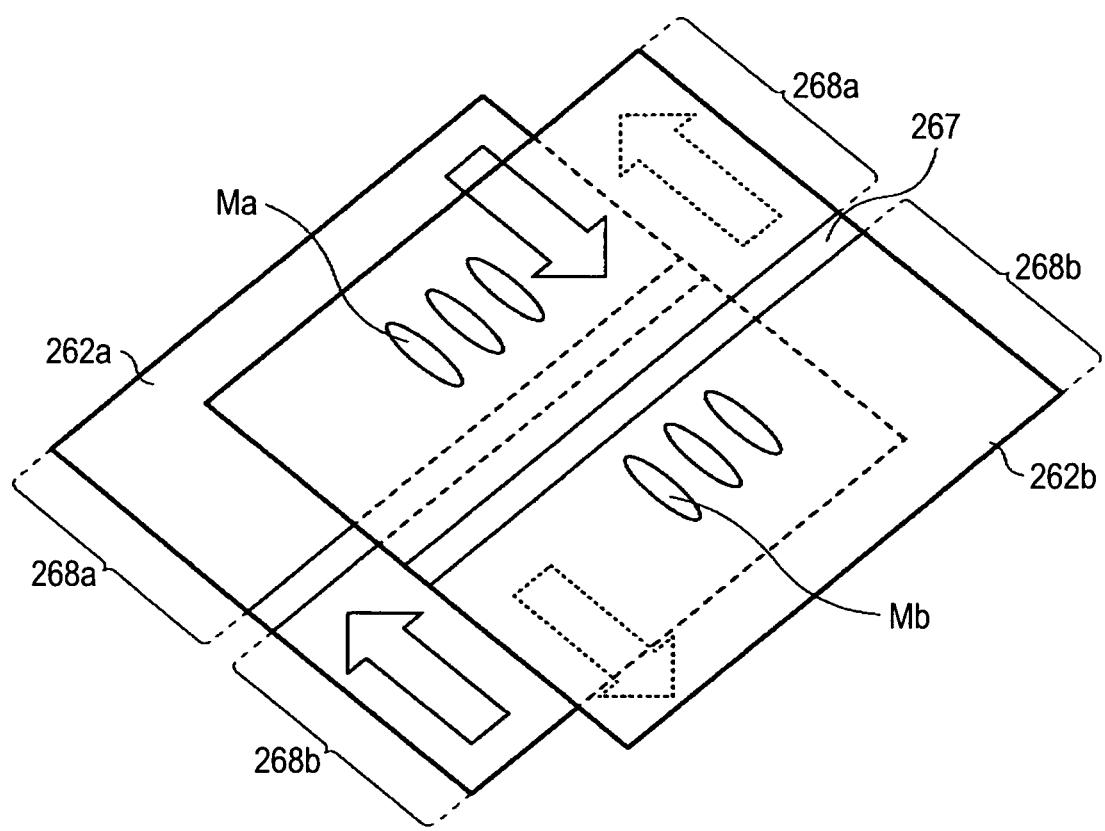
FIG. 7 is a schematic view for explaining the rubbing direction in an alignment film of the liquid crystal light adjusting device shown in FIG. 5.

FIG. 7 is a view showing a direction of rubbing processing of each of the alignment films 262a and 262b. In FIG. 7, the arrow indicates the direction of rubbing processing. In addition, a solid line indicates the direction of rubbing processing on the alignment film 262a, and a dotted line indicates the direction of rubbing processing on the alignment film 262b. This is the same for FIGS. 10, 15, 22, and 27 to be described later. As shown in FIG. 7, rubbing processing on the alignment films 262a and 262b is performed in symmetrical directions with the partition member 267 as a reference. That is, the direction of rubbing processing on the alignment films 262a and 262b in the alignment region 268a and the direction of rubbing processing on the alignment films 262a and 262b in the alignment region 268b are symmetrical with respect to the partition member 267 as a reference. Rubbing processing on the alignment film 262a at the prism 21b side is performed in a direction which is parallel to the tilt direction of the mounting surface Sp of the prism 21b and is toward the partition member 267, and rubbing processing on the alignment film 262b at the transparent substrate 263 side is performed in a direction rotated by 180° from the rubbing direction of the alignment film 262a, that is, in an anti-parallel direction.

By performing the rubbing processing in the directions shown in FIG. 7, the molecules Ma and Mb are oriented so as to be symmetrical with respect to the partition member 267 as a reference. That is, there is a mirror image relationship between the molecule Ma in the liquid crystal layer 260a and the molecule Mb in the liquid crystal layer 260b.

The partition member 267 serves to prevent the mixing of the molecules Ma and Mb with different orientation directions and to align the operation of each molecule Ma in the liquid crystal layer 260a and the operation of each molecule Mb in the liquid crystal layer 260b. Since the molecules Ma and Mb are separated from each other by the partition member 267, the response speed of the liquid crystal light adjusting device 26 when applying a voltage becomes stable. As a result, a change within an image captured by the imaging apparatus 1 becomes uniform. In particular, in moving image photographing, disharmony occurring in the moving image can be eliminated by making the change within the photographed image uniform. In addition, for example, when the liquid crystal light adjusting device 26 is applied to a projector, the brightness of a projected image can be changed uniformly.

The partition member 267 is provided from the alignment film 262a to the alignment film 262b between the alignment region 268a and the alignment region 268b. Specifically, a virtual line is set on the alignment films 262a and 262b such that the predetermined optical axis L1 and reflected light Lref (FIG. 8 to be described later) when the optical axis L1 is reflected by the reflective film 264 are axisymmetric, and the partition member 267 is formed along this virtual line. The partition member 267 may be formed of the same material as the sealant 265, for example, an adhesive such as an epoxy adhesive or an acrylic adhesive. Preferably, the partition member 267 is formed as thin as possible. For example, the partition member 267 has a thickness of about 0.2 µm.

Each of the transparent electrodes 261a and 261b is an electrode for applying a voltage (driving voltage) to the liquid crystal layer 260 and is formed of indium oxide tin (ITO), for example. In addition, wiring lines (not shown) for electrical connection to the transparent electrodes 261a and 261b are appropriately disposed.

The transparent substrate 263 is a substrate for sealing the liquid crystal layer 260 while supporting the transparent electrode 261b, the alignment film 262b, and the reflective film 264. For example, the transparent substrate 263 is a glass substrate. In addition, although the substrate for sealing the liquid crystal layer 260 while supporting the transparent electrode 261a and the alignment film 262a is formed by the prism 21b herein, a transparent substrate may be further provided between the prism 21b and the transparent electrode 261a instead of the prism 21b. However, it can be said that the case where the prism 21b also serves as a substrate as described above is preferable since the number of components of the liquid crystal light adjusting device 26 is reduced.

The reflective film 264 is disposed at the lens barrel member 20 side of the transparent substrate 263 (opposite side of the liquid crystal layer 260), and is a film with a function of reflecting (total reflection and partial reflection) imaging light at the angle of 90°, for example. Details of the reflective film 264 will be described later. Such a reflective film 264 may be a metal film formed of aluminum (Al), silver (Ag), or an alloy thereof, for example.

The sealant 265 is a member for sealing the molecules Ma and Mb in the liquid crystal layer 260 from the lateral surface side. For example, the sealant 265 is an adhesive, such as an epoxy adhesive or an acrylic adhesive. The spacer 266 is a member for keeping the cell gap (thickness) in the liquid crystal layer 260 uniformly. For example, the spacer 266 is formed of a predetermined resin material or glass. An encapsulation section (not shown) is an encapsulation port used when injecting the molecules Ma and Mb into the liquid crystal layer 260 and is also a section for sealing the molecules Ma and Mb in the liquid crystal layer 260 from the outside thereafter.

[Operations and Effects of the Imaging Apparatus 1]
(1. Imaging Operation)

In the imaging apparatus 1, an operation of imaging a subject is performed when the operation button 14 shown in FIG. 1 is operated by a user, and a captured image (imaging data) is acquired. Specifically, as shown in FIGS. 1 to 3, imaging light is incident on the lens barrel device 2 through the lens unit 11 and the optical path of the imaging light is bent within the lens barrel device 2. Then, the imaging light is emitted to the imaging device 3 to be detected. More specifically, in the lens barrel device 2, imaging light incident on the prism 21b through the lens 21a (objective lens) along the optical axis L1 is first reflected within the liquid crystal light adjusting device 26 on the reflective surface (mounting surface Sp) of the prism 21b, as shown in FIG. 3. This reflected light is emitted through the lens 21c along the optical axis L2. Then, the imaging light as reflected light is transmitted through the second to fifth lens groups 22 to 25 in this order and is then emitted from the lens barrel device 2. The imaging light emitted from the lens barrel device 2 is incident on the imaging device 3 through the optical film 15 to be detected. A control processing section (not shown) performs predetermined signal processing on the imaging signal acquired in the imaging device 3 as described above. In addition, the control processing section performs predetermined feedback control on the liquid crystal light adjusting device 26 in the lens barrel device 2 on the basis of the acquired imaging signal.

Figure 8:
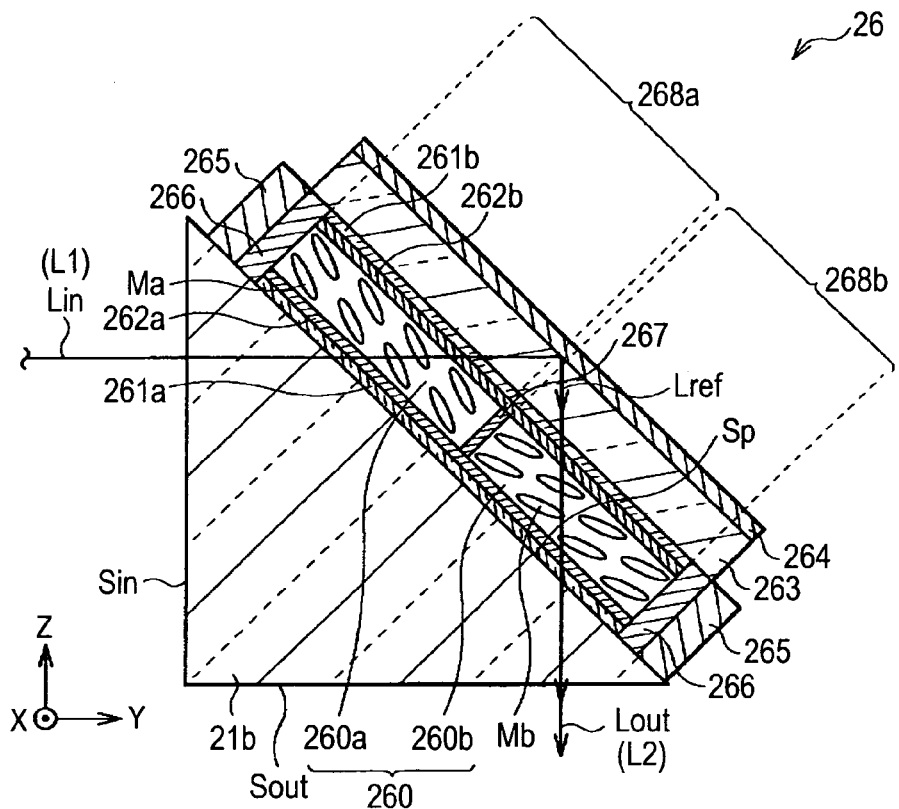
FIG. 8 is a sectional view showing examples of light incident on a reflective film and light reflected from the reflective film which are shown in FIG. 5.

Specifically, in the liquid crystal light adjusting device 26, imaging light (incident light Lin) which is incident on the mounting surface Sp (liquid crystal layer 260) from the incidence surface Sin of the prism 21b obliquely, for example, at the angle of 45° is transmitted through the liquid crystal layer 260a and the like through the prism 21b and is then reflected by the reflective film 264 (total reflection), as shown in FIG. 8. Then, the reflected light Lref is transmitted through the liquid crystal layer 260b and the like and is emitted from the emission surface Sout of the prism 21b as emitted light Lout. Here, it is assumed that light before being transmitted through the liquid crystal light adjusting device 26 after being reflected by the reflective film 264 is the reflected light Lref. In this case, when a predetermined voltage (driving voltage) is applied to the liquid crystal layer 260, the orientation directions (long axis directions) of the molecules Ma and Mb change. Accordingly, the amount of imaging light transmitted through the liquid crystal layer 260 is also changed. Thus, by adjusting the driving voltage at this time, the amount of imaging light transmitted through the entire liquid crystal light adjusting device 26 can be electrically (not mechanically) adjusted (arbitrary light adjusting operation is possible). In this way, light amount adjustment (light adjustment) of imaging light is performed within the lens barrel device 2.

(2. Operations of Characteristic Sections)

Next, operations of characteristic sections of the liquid crystal light adjusting device 26 will be described while comparing the operations with those in comparative examples (first and second comparative examples).

First Comparative Example

Figure 9:
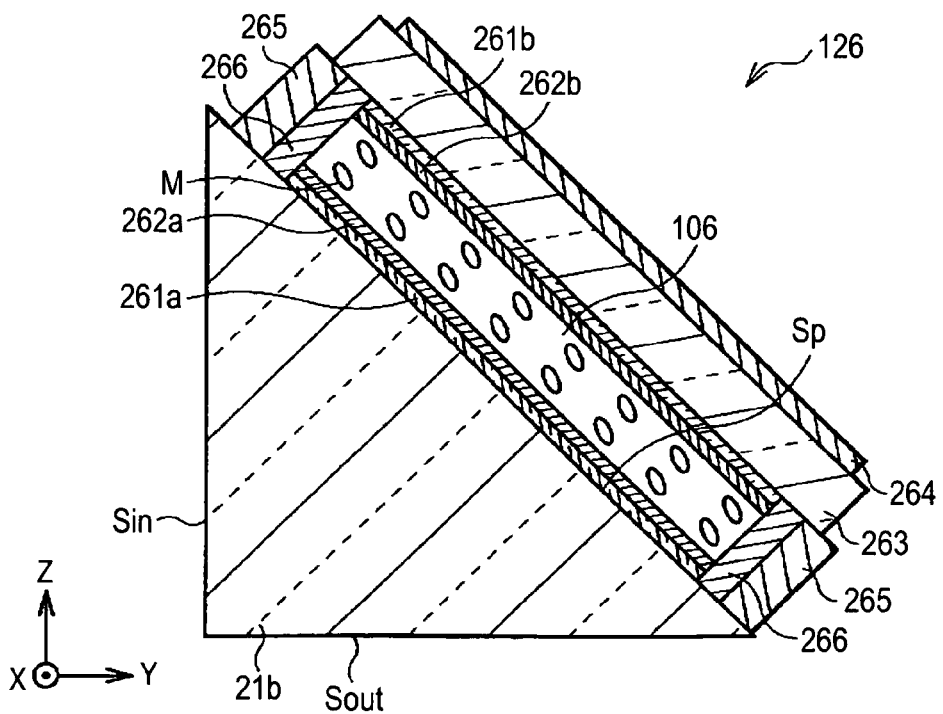
FIG. 9 is a sectional view of a liquid crystal light adjusting device in a first comparative example.

FIG. 9 shows a sectional view (Y-Z sectional view) of a liquid crystal light adjusting device 126 in a first comparative example. The partition member 267 is not provided in a liquid crystal layer 106, and orientation directions of all molecules M in the liquid crystal layer 106 are the same. In this point, the liquid crystal light adjusting device 126 is different from the liquid crystal light adjusting device 26 according to the present embodiment.

Figure 10:
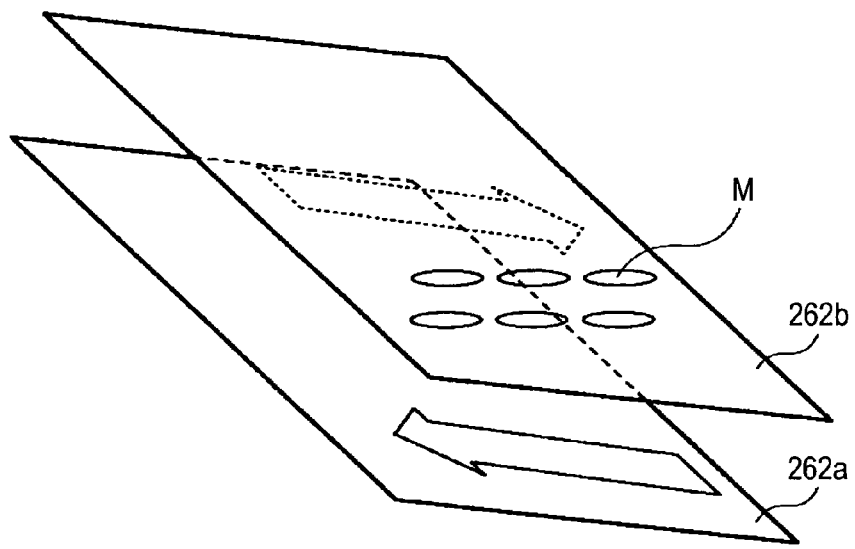
FIG. 10 is a schematic view for explaining the rubbing direction in an alignment film of the liquid crystal light adjusting device shown in FIG. 9.

FIG. 10 shows the direction of rubbing processing on alignment films 262a and 262b in the liquid crystal light adjusting device 126. Unlike the liquid crystal light adjusting device 26, rubbing processing is performed in the same direction within the alignment film 262a and the alignment film 262 in the first comparative example. The rubbing processing on the alignment films 262a and 262b is performed in the X-axis direction. Rubbing processing on the alignment film 262a is performed in a forward direction from the back in the plane of FIG. 9, and rubbing processing on the alignment film 262b is performed in a direction rotated by 180° from the direction of the rubbing processing on the alignment film 262a (in a backward direction from the front in the plane of FIG. 9).

Figure 11:
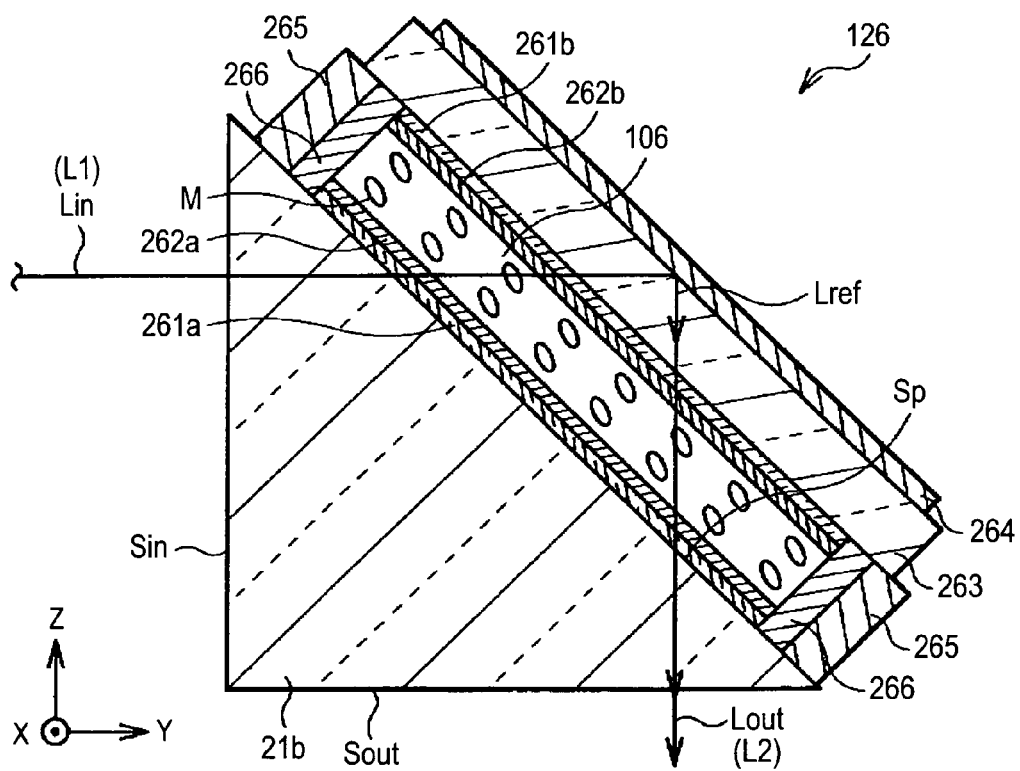
FIG. 11 is a sectional view showing examples of light incident on a reflective film and light reflected from the reflective film which are shown in FIG. 9.

Here, an operation for light adjustment of the liquid crystal light adjusting device 126 will be described using FIGS. 11 to 13. As shown in FIG. 11, also for the liquid crystal light adjusting device 126, incident light Lin is transmitted through the liquid crystal layer 106 and the like, and the reflected light Lref reflected by the reflective film 264 is transmitted through the liquid crystal layer 106 and the like again and is then emitted as emitted light Lout, similar to the liquid crystal light adjusting device 26. In the first comparative example, the orientation direction of the molecule M in the liquid crystal layer 106 through which the incident light Lin and the reflected light Lref are transmitted is the same.

Figure 12A:
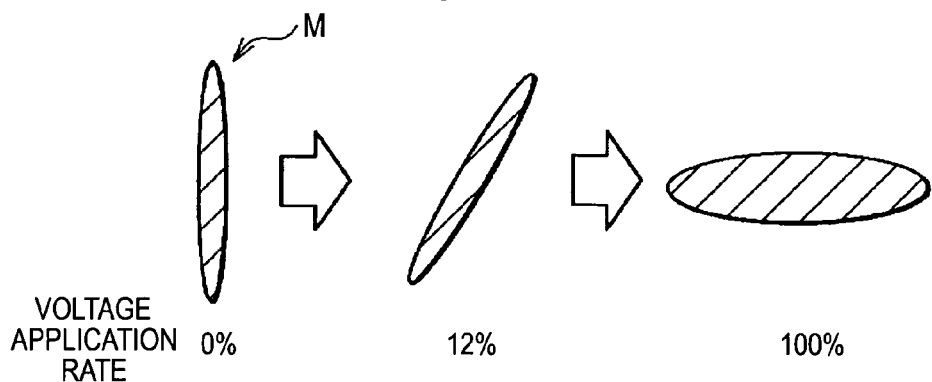
FIGS. 12A and 12B are schematic views for explaining a liquid crystal molecule seen from the traveling direction of light shown in FIG. 11.
Figure 12B:
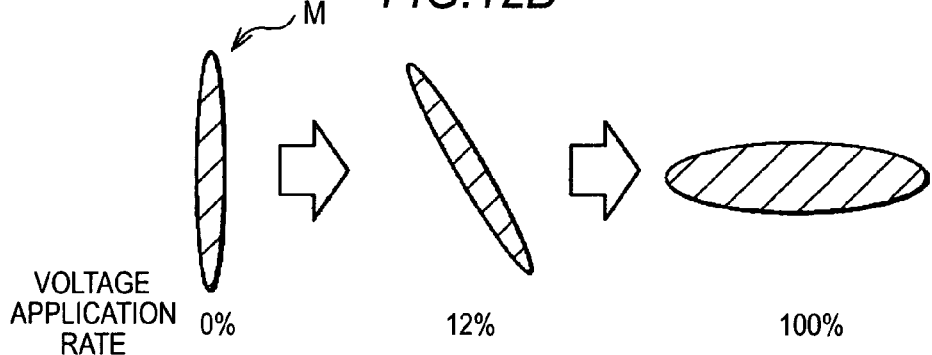

FIGS. 12A and 12B are schematic views showing the shape of the molecule M seen from the traveling directions of the incident light Lin and the reflected light Lref. FIG. 12A shows the shape of the molecule M seen from the traveling direction of the incident light Lin, and FIG. 12B shows the shape of the molecule M seen from the traveling direction of the reflected light Lref. As an applied voltage gradually rises from the voltage application rate of 0% (state where no voltage is applied) to the voltage application rate of 100% (state where a maximum voltage is applied), the molecule M becomes inclined in a direction controlled by rubbing processing. In this case, since the orientation directions of all molecules M in the liquid crystal layer 106 are the same, the angle between the long axis direction of the molecule M and the traveling direction of the incident light Lin is different from the angle between the long axis direction of the molecule M and the traveling direction of the reflected light Lref (for example, voltage application rate=12%).

Figure 13:
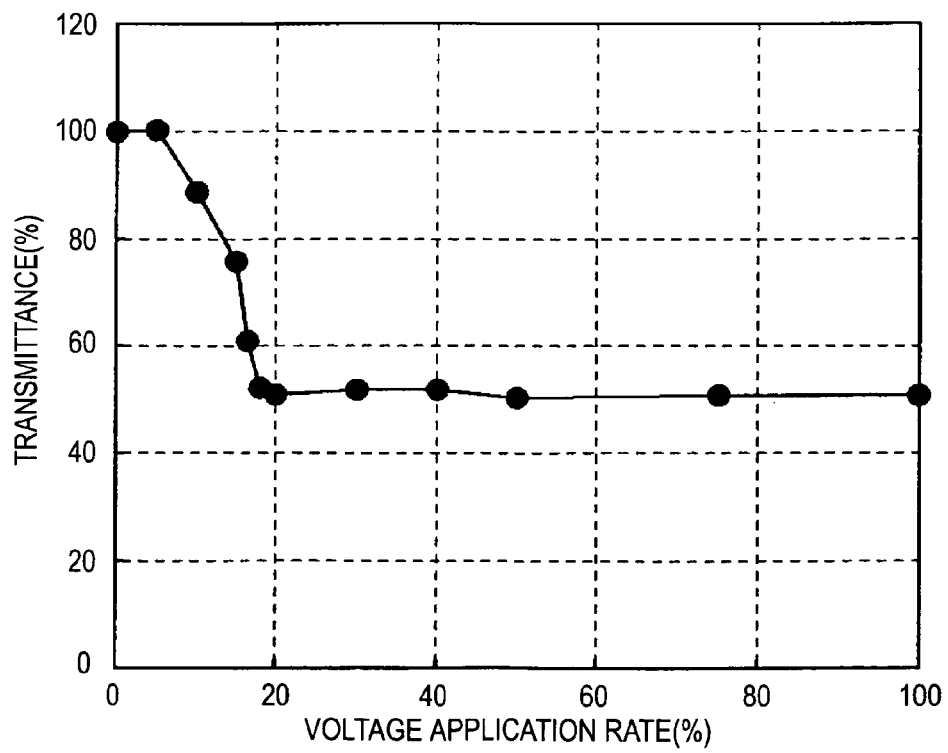
FIG. 13 is a characteristic view showing an example of the relationship between the voltage application rate and the transmittance in the liquid crystal light adjusting device shown in FIG. 9.

FIG. 13 is a characteristic view showing an example of the relationship between the voltage application rate and the transmittance (light transmittance) in the first comparative example when applying a voltage. In the first comparative example, negative type guest-host liquid crystal is used for the liquid crystal layer 106, and the relationship is shown with the amount of transmitted imaging light in a state where a voltage is not applied (0 V state) as a reference (100%). In addition, these conditions are the same for FIGS. 18, 20, 25, and 29 to be described later. From FIG. 13, it can be seen that the amount of blocked light in the liquid crystal layer 106 abruptly increases (the transmittance abruptly decreases) as the voltage application rate increases and the transmittance converges on about 50% (almost constant value) when the voltage application rate is about 50%. In addition, the same result as the characteristics shown in FIG. 13 was obtained even if rubbing processing was performed in opposite directions to the directions of rubbing processing shown in FIG. 10.

The value, the inclination, or the light adjustment range when the transmittance changes in such a liquid crystal light adjusting device changes according to a material or concentration of a liquid crystal layer, a cell gap (thickness) of the liquid crystal layer, the kind (material) of an alignment film, and the like. For example, when positive type guest-host liquid crystal is used in the liquid crystal layer 106, the transmittance is low in a state where no voltage is applied (voltage application rate=0%) and the transmittance tends to increase with the voltage application rate, contrary to the characteristics shown in FIG. 13.

Second Comparative Example

Figure 14:
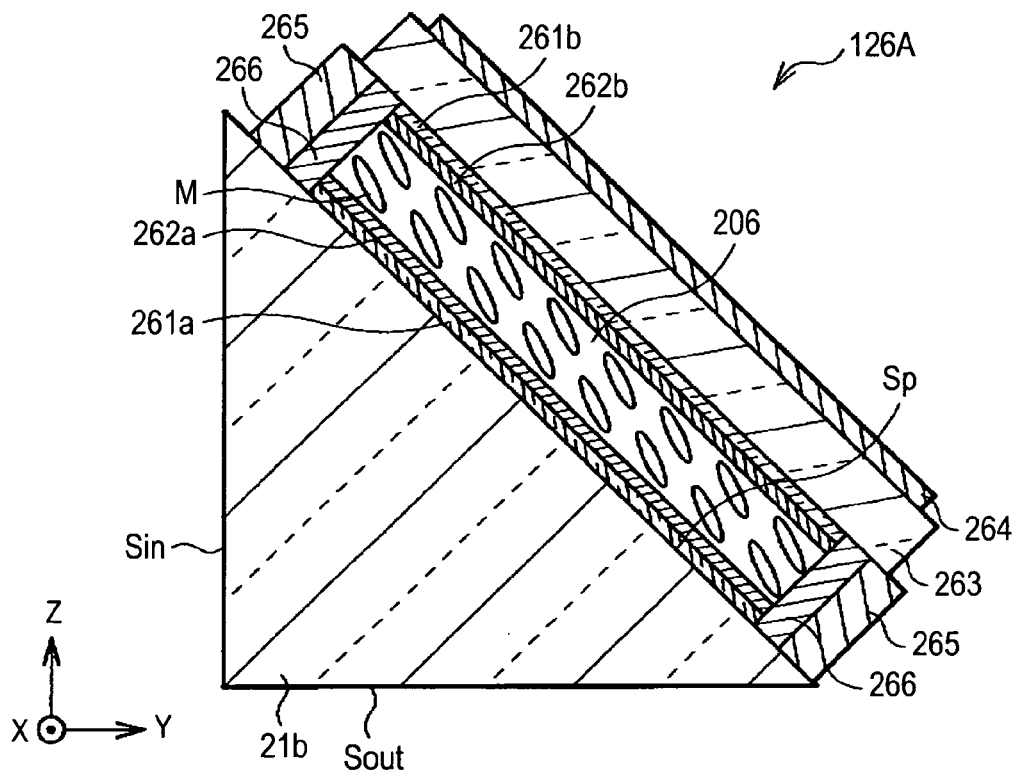
FIG. 14 is a sectional view of a liquid crystal light adjusting device in a second comparative example.

FIG. 14 shows a sectional view (Y-Z sectional view) of a liquid crystal light adjusting device 126A in a second comparative example. In the liquid crystal light adjusting device 126A in the second comparative example, the partition member 267 is not provided in a liquid crystal layer 206 similar to the liquid crystal light adjusting device 126 in the first comparative example, and orientation directions of all molecules M in the liquid crystal layer 206 are the same. In the second comparative example, the orientation directions of the molecules M (rubbing directions of the alignment films 262a and 262b) are different from those in the first comparative example.

Figure 15:
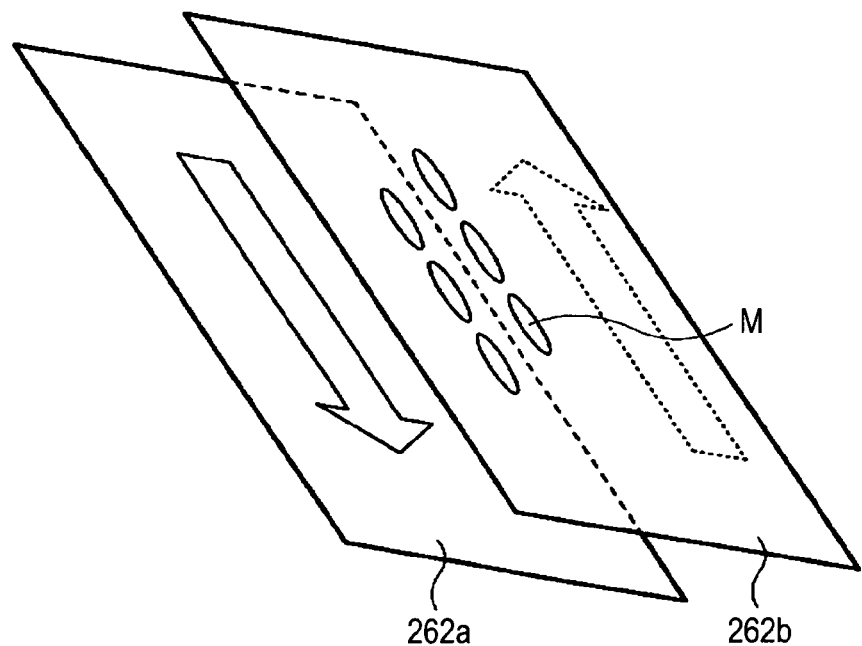
FIG. 15 is a schematic view for explaining the rubbing direction in an alignment film of the liquid crystal light adjusting device shown in FIG. 14.

FIG. 15 shows the rubbing directions of the alignment films 262a and 262b in the liquid crystal light adjusting device 126A. As in the first comparative example, rubbing processing is performed in the same direction within the alignment film 262a, and rubbing processing is performed in the same direction within the alignment film 262b. The rubbing processing is performed in a direction parallel to the tilt direction of the mounting surface Sp of the prism 21b. Moreover, the rubbing processing is performed in a direction of going down the inclination of the mounting surface Sp in the alignment film 262a and in a direction rotated by 180° from the rubbing direction on the alignment film 262a (in a direction of going up the inclination of the mounting surface Sp) in the alignment film 262b.

Figure 16:
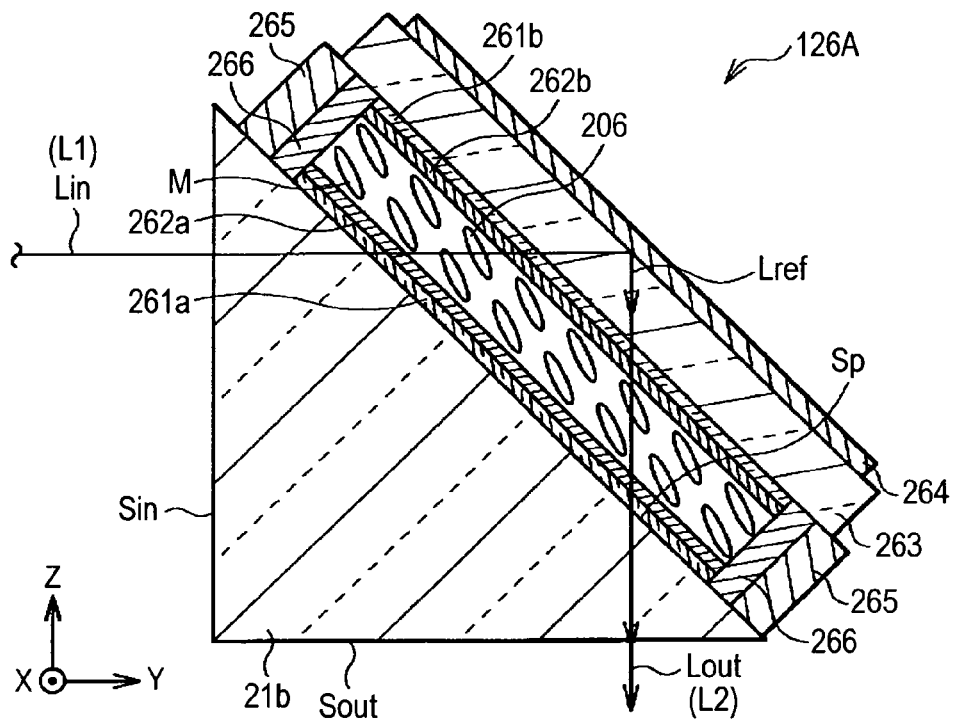
FIG. 16 is a sectional view showing examples of light incident on a reflective film and light reflected from the reflective film which are shown in FIG. 14.

Here, an operation for light adjustment of the liquid crystal light adjusting device 126A will be described using FIGS. 16 to 18. As shown in FIG. 16, also for the liquid crystal light adjusting device 126A, incident light Lin is transmitted through the liquid crystal layer 206, and the reflected light Lref reflected by the reflective film 264 is transmitted through the liquid crystal layer 206 and the like again and is then emitted as emitted light Lout. Also in the second comparative example, the orientation direction of the molecule M in the liquid crystal layer 206 through which the incident light Lin and the reflected light Lref are transmitted is the same as in the first comparative example.

Figure 17A:
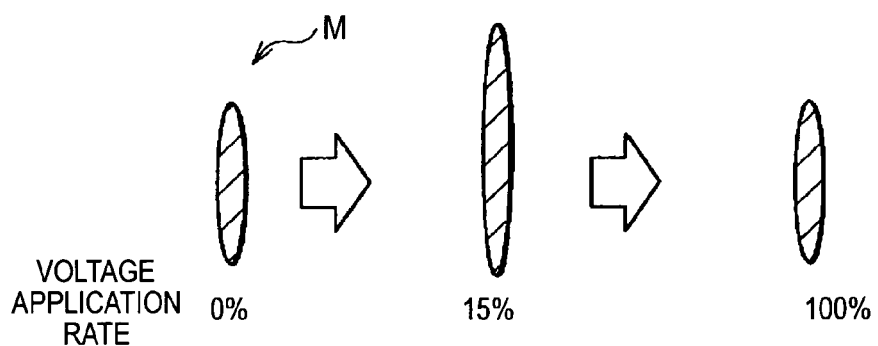
FIGS. 17A and 17B are schematic views for explaining a liquid crystal molecule seen from the traveling direction of light shown in FIG. 16.
Figure 17B:
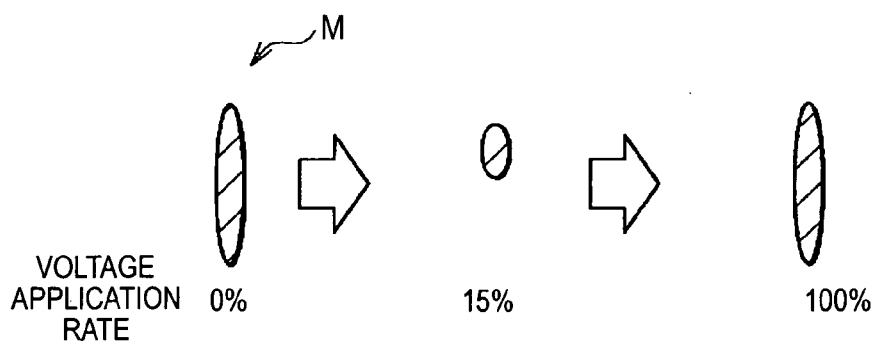

FIGS. 17A and 17B are schematic views showing the shape of the molecule M seen from the traveling directions of the incident light Lin and the reflected light Lref. FIG. 17A shows the shape of the molecule M seen from the traveling direction of the incident light Lin, and FIG. 17B shows the shape of the molecule M seen from the traveling direction of the reflected light Lref. As in the first comparative example, since the orientation directions of all molecules M in the liquid crystal layer 260 are the same, the angle between the long axis direction of the molecule M and the traveling direction of the incident light Lin is different from the angle between the long axis direction of the molecule M and the traveling direction of the reflected light Lref (for example, voltage application rate=15%).

Figure 18:
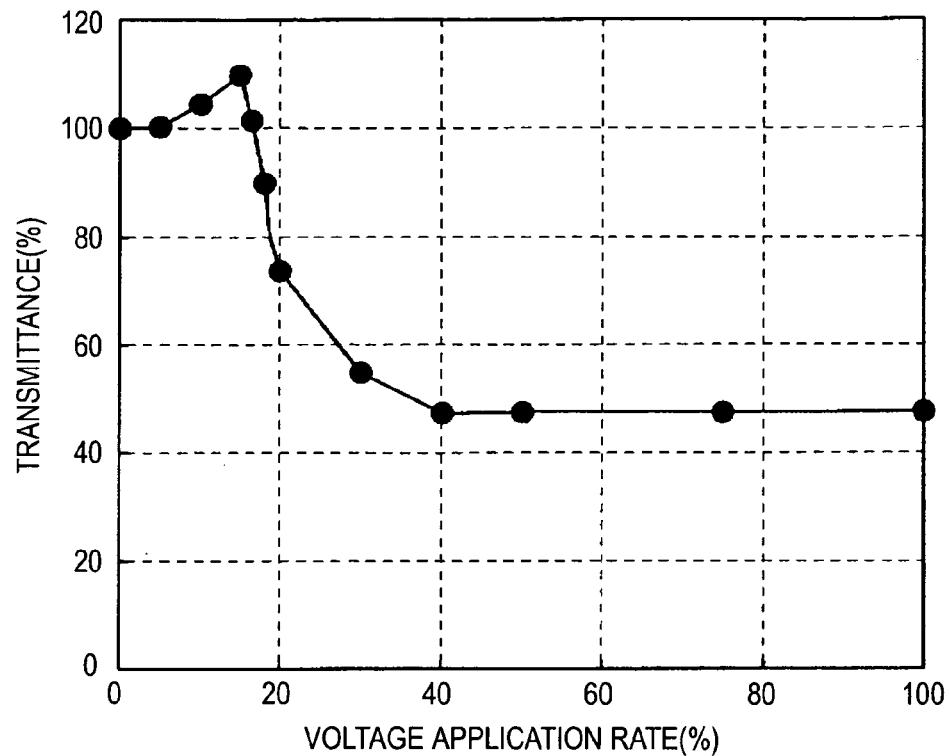
FIG. 18 is a characteristic view showing an example of the relationship between the voltage application rate and the transmittance in the liquid crystal light adjusting device shown in FIG. 14.

FIG. 18 shows the relationship between the voltage application rate and the transmittance in the liquid crystal light adjusting device 126A when a voltage is applied. In the second comparative example, the transmittance was reduced to 45% (almost constant value) when the voltage application rate was about 40%. In FIG. 18, unlike the first comparative example (FIG. 13), the transmittance does not continuously decrease with an increase in the voltage application rate, but the transmittance rises once until the voltage application rate becomes about 15% (transmittance=about 110%). This is because the traveling direction of the reflected light Lref and the long axis direction of the molecule M are approximately parallel to each other when the voltage application rate is about 15% (FIG. 17B). In addition, the same result as the characteristics shown in FIG. 18 was obtained even if rubbing processing was performed in opposite directions to the directions of rubbing processing shown in FIGS. 17A and 17B.

(Operations of the Present Embodiment)

Unlike the first and second comparative examples described above, in the liquid crystal light adjusting device 26 according to the present embodiment, the incident light Lin is transmitted through the alignment region 268a and the reflected light Lref is transmitted through the alignment region 268b where the orientation direction of a liquid crystal molecule is different from that in the alignment region 268a, as shown in FIG. 8.

Figure 19A:
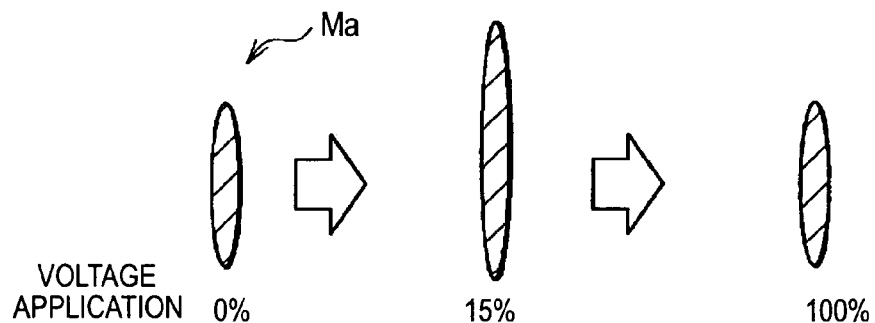
FIGS. 19A and 19B are schematic views for explaining a liquid crystal molecule seen from the traveling direction of light shown in FIG. 8.
Figure 19B:
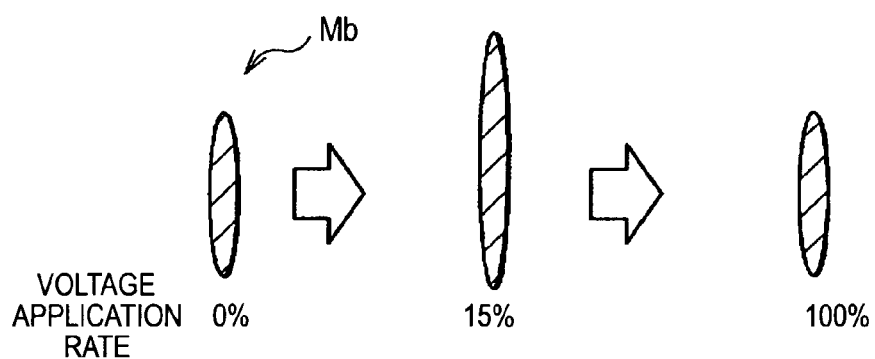

FIGS. 19A and 19B are schematic views showing the shapes of the molecules Ma and Mb seen from the traveling directions of the incident light Lin and the reflected light Lref in the liquid crystal light adjusting device 26 according to the present embodiment. FIG. 19A shows the shape of the molecule Ma seen from the traveling direction of the incident light Lin, and FIG. 19B shows the shape of the molecule Mb seen from the traveling direction of the reflected light Lref. As an applied voltage gradually rises, long axis directions of both the molecules Ma and Mb become almost perpendicular to the traveling directions of the incident light Lin and the reflected light Lref at the voltage application rate of about 15%. In the liquid crystal light adjusting device 26 according to the present embodiment, the incident light Lin and the reflected light Lref are transmitted through the alignment regions 268a and 268b, respectively. Accordingly, both the angle between the long axis direction of the molecule Ma and the traveling direction of the incident light Lin and the angle between the long axis direction of molecule Mb and the traveling direction of the reflected light Lref are controlled.

In particular, since the orientation direction of the molecule Ma and the orientation direction of the molecule Mb are symmetrical with respect to the partition member 267 as a reference in the liquid crystal light adjusting device 26, the angle between the long axis direction of the molecule Ma and the traveling direction of the incident light Lin becomes almost equal to the angle between the long axis direction of the molecule Mb and the traveling direction of the reflected light Lref.

Figure 20:
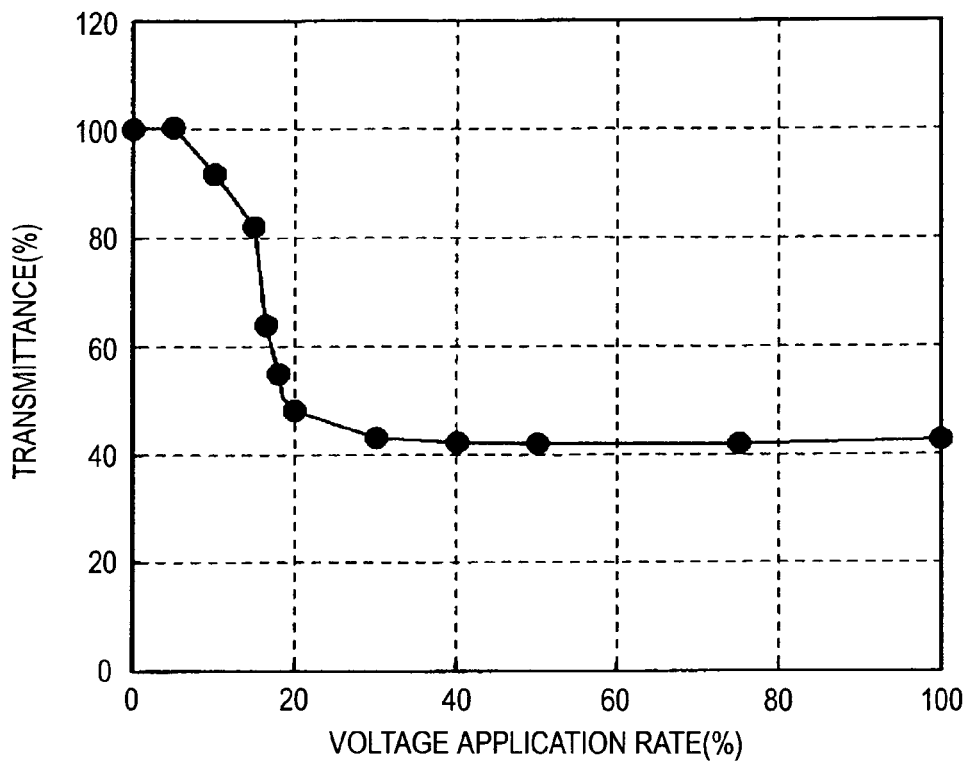
FIG. 20 is a characteristic view showing an example of the relationship between the voltage application rate and the transmittance in the liquid crystal light adjusting device shown in FIG. 5.

FIG. 20 shows an example of the relationship between the voltage application rate and the transmittance (light transmittance) in the liquid crystal light adjusting device 26 when a voltage is applied. In the present embodiment, it can be seen that the transmittance converges on about 40% (almost constant value) when the voltage application rate is about 40%. That is, the light adjustment range in the liquid crystal light adjusting device 26 is about 60% (range of the transmittance of 40% to 100%).

In the present embodiment, it can be seen that the transmittance decreases up to about 40% and the light adjustment range extends up to about 60% compared with the first comparative example (transmittance of 50%) and the second comparative example (transmittance of 55%).

As described above, in the liquid crystal light adjusting device 26 according to the present embodiment, the reflective film 264 is provided at the other surface side of the liquid crystal layer 260 and the liquid crystal layer 260 has the alignment regions 268a and 268b with different orientation directions of the molecules Ma and Mb. Accordingly, the incident light Lin and the reflected light Lref are transmitted through the alignment regions 268a and 268b with different orientation directions of the molecules Ma and Mb (FIG. 8). As a result, both the angle between the long axis direction of the molecule Ma and the traveling direction of the incident light Lin and the angle between the long axis direction of the molecule Mb and the traveling direction of the reflected light Lref can be controlled. Thus, the light adjustment range of the liquid crystal light adjusting device 26 can be extended.

In particular, since the orientation directions of the molecules Ma and Mb of the adjacent alignment regions 268a and 268b are symmetrical with respect to the boundary (partition member 267) of the alignment regions 268a and 268b as a reference in the present embodiment, the angle between the traveling direction of the incident light Lin and the long axis direction of the molecule Ma becomes almost equal to the angle between the traveling direction of the reflected light Lref and the long axis direction of the molecule Mb. As a result, the light adjustment range is extended more effectively.

In addition, although the liquid crystal light adjusting device 26 is configured to have the two alignment regions 268a and 268b, the liquid crystal light adjusting device may be configured to have three or more alignment regions. In this case, orientation directions of liquid crystal molecules in the respective alignment regions may be different, or alignment regions with the same orientation direction may be present.

<Modifications>

Next, a modification of the first embodiment will be described. In addition, the same reference numerals are given to the same components as in the embodiment described above, and explanation thereof will be appropriately omitted.

Figure 21:
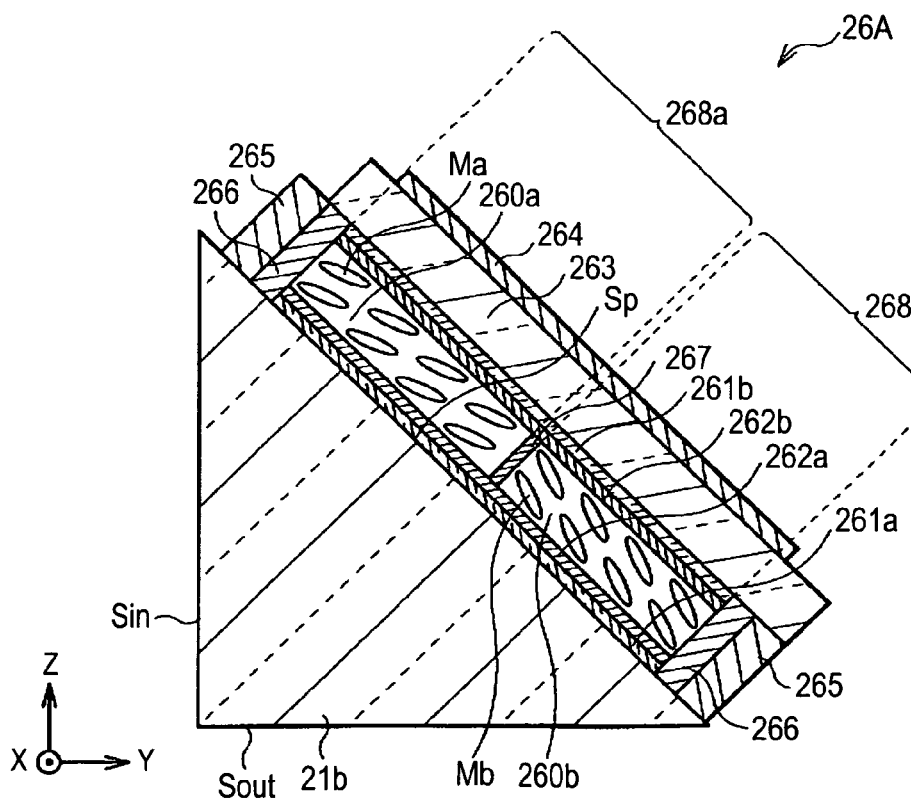
FIG. 21 is a sectional view of a liquid crystal light adjusting device in a modification of the first embodiment.

FIG. 21 is a schematic view showing an example of the sectional configuration (an example of the configuration of the Y-Z section) of a liquid crystal light adjusting device 26A in the modification together with the prism 21b. In the liquid crystal light adjusting device 26A, the orientation directions of the molecules Ma, and Mb (directions of rubbing processing on the alignment films 262a and 262b) are opposite those in the liquid crystal light adjusting device 26 described above.

Figure 22:
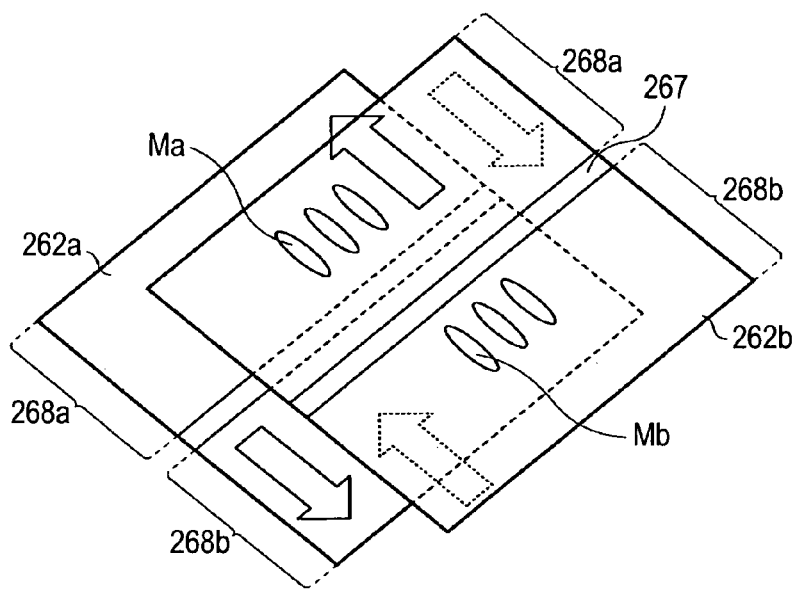
FIG. 22 is a schematic view for explaining the rubbing direction in an alignment film of the liquid crystal light adjusting device shown in FIG. 21.

FIG. 22 shows a direction of rubbing processing in the alignment films 262a and 262b. Rubbing processing on the alignment films 262a and 262b is performed in symmetrical directions with the partition member 267 as a reference. In this modification, rubbing processing is performed in opposite directions to those in the liquid crystal light adjusting device 26 according to the embodiment described above. Specifically, rubbing processing on the alignment film 262b at the transparent substrate 263 side is performed in a direction which is parallel to the tilt direction of the mounting surface Sp of the prism 21b and is toward the partition member 267, and rubbing processing on the alignment film 262a at the prism 21b side is performed in a direction rotated by 180° from the rubbing direction of the alignment film 262b, that is, in an anti-parallel direction.

By performing the rubbing processing in the directions shown in FIG. 22, the molecules Ma and Mb are oriented so as to be symmetrical with respect to the partition member 267 as a reference. That is, there is a mirror image relationship between the molecule Ma in the liquid crystal layer 260a and the molecule Mb in the liquid crystal layer 260b.

Figure 23:
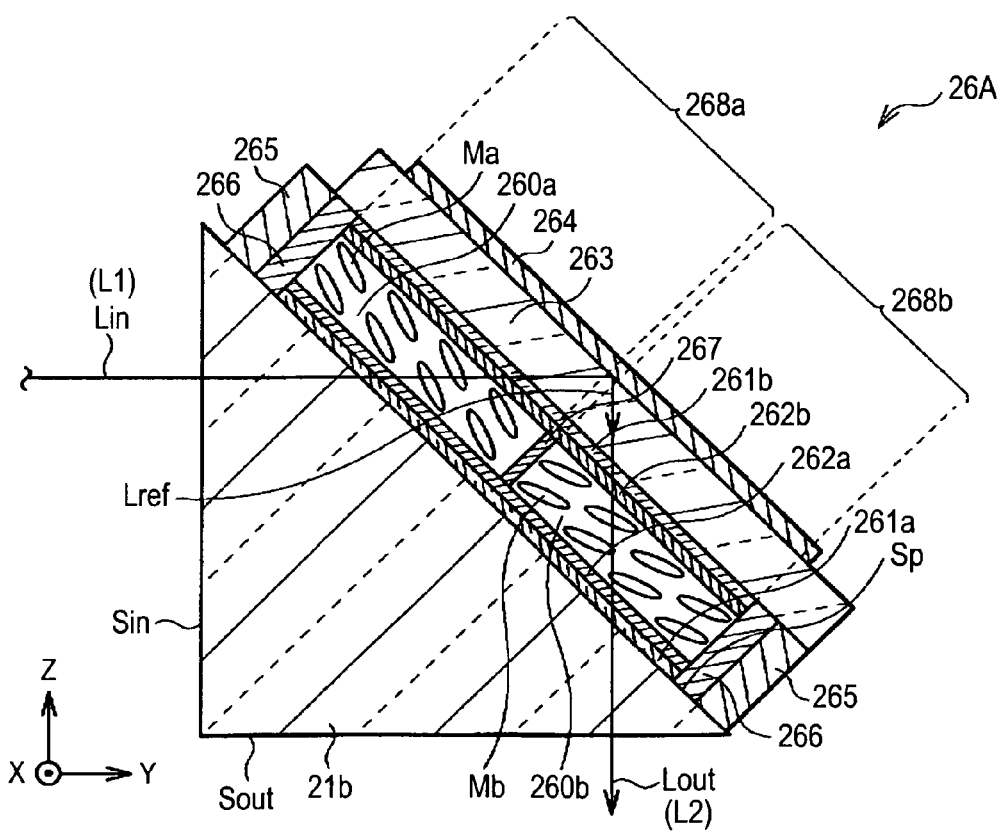
FIG. 23 is a sectional view showing examples of light incident on a reflective film and light reflected from the reflective film which are shown in FIG. 21.

Also in the liquid crystal light adjusting device 26A in this modification, it is possible to perform the same light adjusting operation as in the liquid crystal light adjusting device 26. That is, as shown in FIG. 23, imaging light (incident light Lin) incident from the incidence surface Sin of the prism 21b is transmitted through the liquid crystal layer 260a and the like through the prism 21b and is then reflected by the reflective film 264. Then, the reflected light Lref is transmitted through the liquid crystal layer 260b and the like and is emitted from the emission surface Sout of the prism 21b as emitted light Lout. In the liquid crystal light adjusting device 26A, the incident light Lin is transmitted through the alignment region 268a, and the reflected light Lref is transmitted through the alignment region 268b where the orientation direction of a liquid crystal molecule is different from that in the alignment region 268a.

Figure 24A:
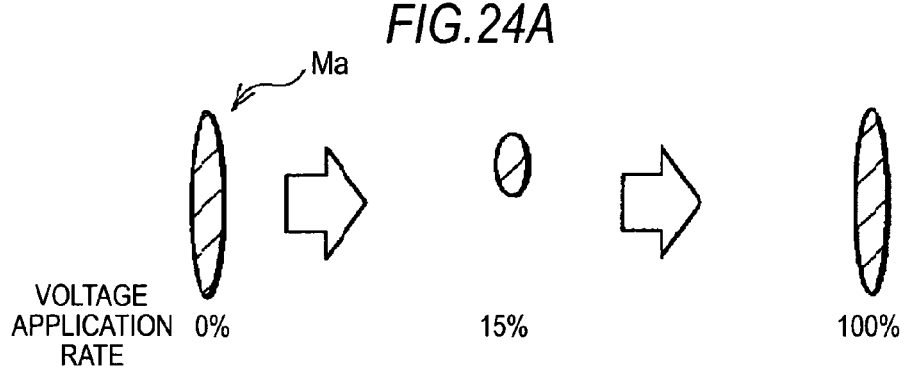
FIGS. 24A and 24B are schematic views for explaining a liquid crystal molecule seen from the traveling direction of light shown in FIG. 23.
Figure 24B:
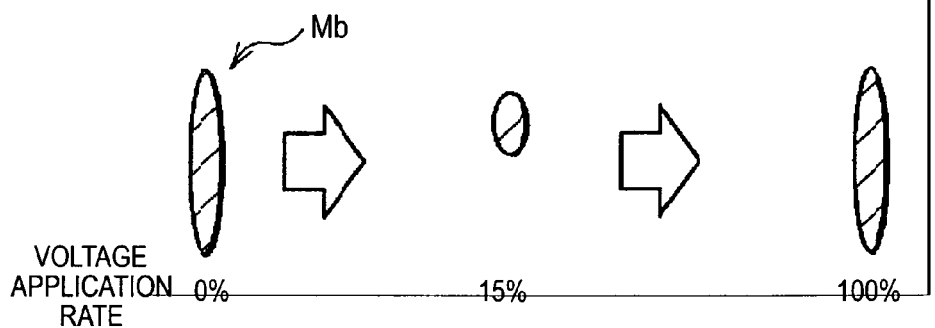

FIGS. 24A and 24B are schematic views showing the shapes of the molecules Ma and Mb seen from the traveling directions of the incident light Lin and the reflected light Lref. FIG. 24A shows the shape of the molecule Ma seen from the traveling direction of the incident light Lin, and FIG. 24B shows the shape of the molecule Mb seen from the traveling direction of the reflected light Lref. As an applied voltage gradually rises, long axis directions of both the molecules Ma and Mb become almost parallel to the incident light Lin and the reflected light Lref at the voltage application rate of about 15%. That is, at the voltage application rate of 15%, the molecules Ma and Mb are oriented in directions in which the incident light Lin and the emitted light Lout are easily transmitted through the molecules Ma and Mb.

Figure 25:
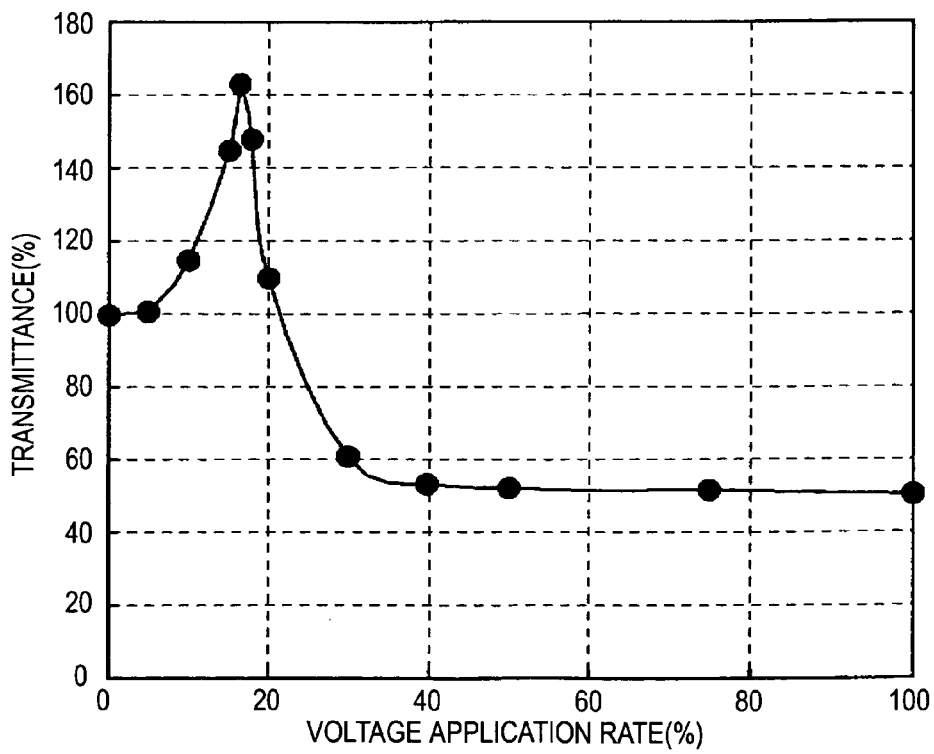
FIG. 25 is a characteristic view showing an example of the relationship between the voltage application rate and the transmittance in the liquid crystal light adjusting device shown in FIG. 21.

FIG. 25 shows an example of the relationship between the voltage application rate and the transmittance in the liquid crystal light adjusting device 26A. In this modification, the transmittance rises once abruptly at the voltage application rate of about 15%, unlike FIG. 20. As described above, this is to make the molecules Ma and Mb oriented in directions in which the incident light Lin and the emitted light Lout are easily transmitted through the molecules Ma and Mb. After the peak of the transmittance, the transmittance decreases with an increase in the voltage application rate, and the transmittance converges on about 50% (almost constant value) when the voltage application rate is about 50%.

From FIG. 25, it is thought that the light adjustment range in this modification is narrow compared with that in the above-described embodiment since light can be blocked up to only about 50% (transmittance). However, at the voltage application rate of 15%, the transmittance increases compared with that when no voltage is applied, and the transmittance is about 160%. Therefore, when this peak is taken into consideration, the light adjustment range is 110% (range of the transmittance of 50% to 160%).

Thus, the liquid crystal light adjusting device 26A capable of realizing a wide light adjustment range is useful in the field of an imaging apparatus and the like. On the other hand, even if the transmittance rises once when a voltage is applied as described above, the voltage range which can be used is limited because a subsequent decrease in the transmittance is steep. For this reason, in consideration of the characteristics, it is desirable to use the liquid crystal light adjusting device 26 or the liquid crystal light adjusting device 26A properly according to the application situation of a liquid crystal light adjusting device.

Second Embodiment

Next, a second embodiment will be described. In addition, the same reference numerals are given to the same components as in the first embodiment, and explanation thereof will be appropriately omitted.

Figure 26:
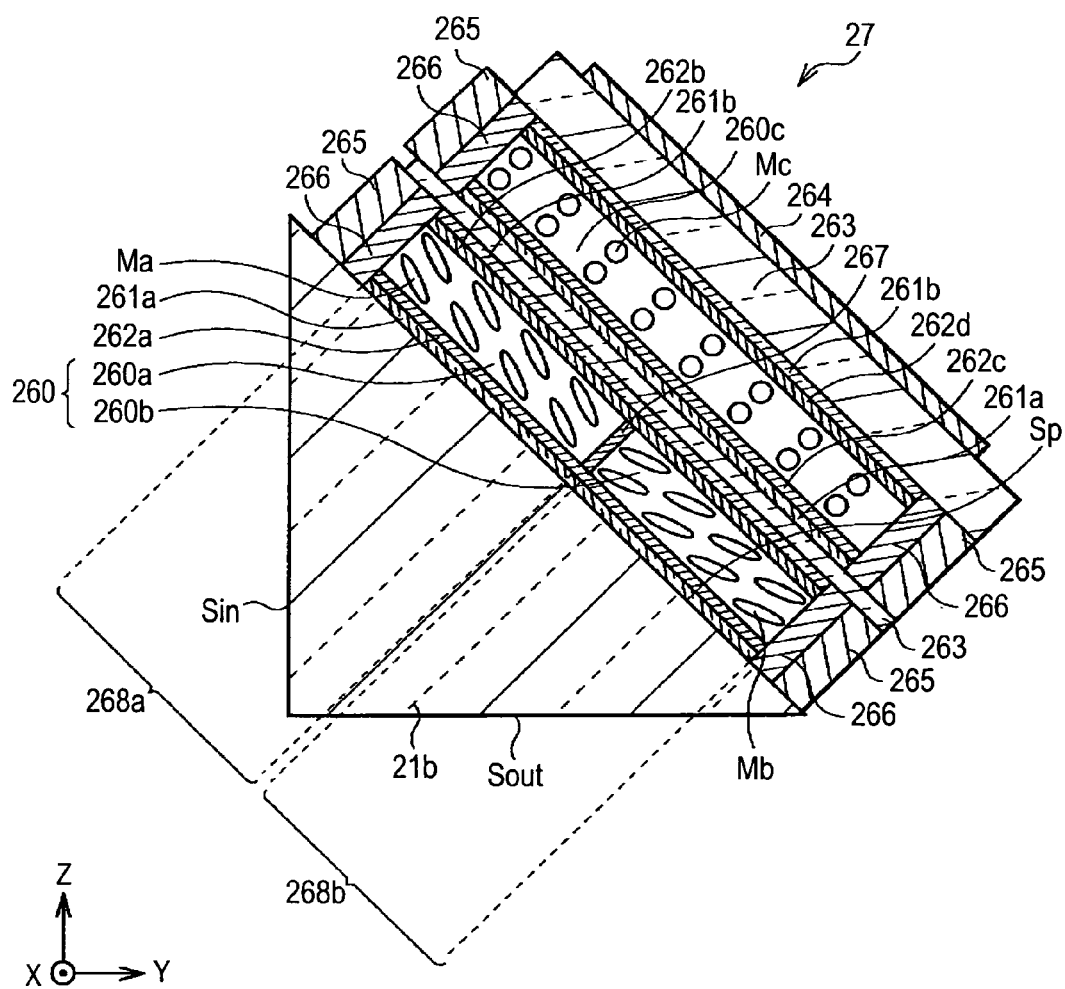
FIG. 26 is a sectional view of a liquid crystal light adjusting device according to a second embodiment of the present disclosure.

FIG. 26 is a schematic view showing an example of the sectional configuration (an example of the configuration of the Y-Z section) of a liquid crystal light adjusting device 27 according to the second embodiment together with the prism 21b. In the liquid crystal light adjusting device 27, a liquid crystal layer has a two-layer (multi-layer) structure, unlike the liquid crystal light adjusting device 26 according to the first embodiment in which the liquid crystal layer has a single-layer (mono-layer) structure (liquid crystal layer 260). That is, in the liquid crystal light adjusting device 27, two layers of liquid crystal layers 260 and 260c are laminated, as will be described in detail later.

Specifically, the liquid crystal light adjusting device 27 has a laminated structure in which a transparent electrode 261a, an alignment film 262a, a liquid crystal layer 260, an alignment film 262b, a transparent electrode 261b, a transparent substrate 263, a transparent electrode 261a, an alignment film 262c, the liquid crystal layer 260c (second liquid crystal layer), an alignment film 262d, a transparent electrode 261b, a transparent substrate 263, and a reflective film 264 are laminated in this order from the prism 21b side. Similar to the liquid crystal light adjusting device 26, the liquid crystal light adjusting device 27 has alignment regions 268a and 268b, and the liquid crystal layer 260 is formed by the liquid crystal layer 260a and the liquid crystal layer 260b divided by the partition member 267. In addition, sealant 265, a spacer 266, and an encapsulation section (not shown) are provided at the lateral surface side of each of the liquid crystal layers 260 and 260c.

Each of the liquid crystal layers 260 and 260c is formed using guest-host liquid crystal containing a dichroic coloring matter, similar to the liquid crystal light adjusting device 26. Specifically, the liquid crystal layers 260a and 260b included in the liquid crystal layer 260 contain molecules Ma and Mb, respectively, and the liquid crystal layer 260c contains molecules Mc (liquid crystal molecules and dichroic dye molecules). In addition, orientation directions of the molecules Ma and Mb are different from each other similar to the first embodiment. In addition, although orientation directions of all molecules Mc in the liquid crystal layer 260c are the same herein, the liquid crystal layer 260c may be formed as a liquid crystal layer having a plurality of alignment regions with different orientation directions of liquid crystal molecules, similar to the liquid crystal layer 260.

Figure 27:
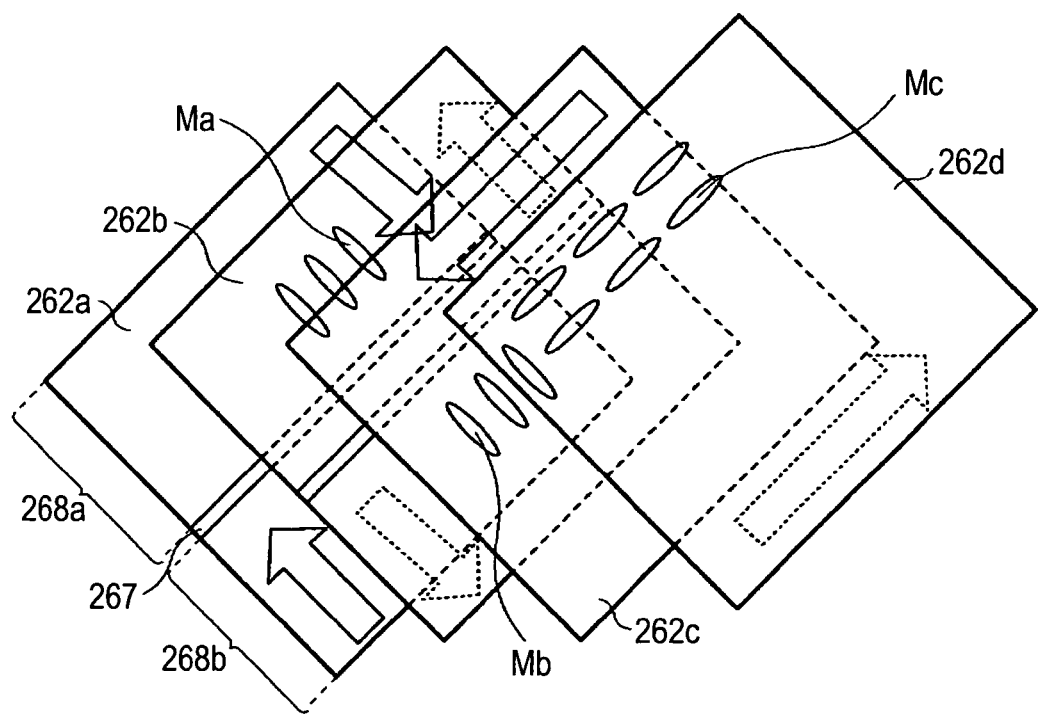
FIG. 27 is a schematic view for explaining the rubbing direction in an alignment film of the liquid crystal light adjusting device shown in FIG. 26.

FIG. 27 shows rubbing directions of the alignment films 262a, 262b, 262c, and 262d. As shown in FIG. 27, rubbing processing on the alignment films 262a and 262b is performed in symmetrical directions with the partition member 267 as a reference. The rubbing direction is the same as that in the first embodiment (FIG. 7). Rubbing processing on the alignment films 262c and 262d is performed in a direction perpendicular to the direction of the rubbing processing on the alignment films 262a and 262b. Specifically, rubbing processing on the alignment film 262c is performed in a forward direction from the back in the plane of FIG. 26, and rubbing processing on the alignment film 262d is performed in a direction rotated by 180° from the direction of the rubbing processing on the alignment film 262c (in a backward direction from the front in the plane of FIG. 26).

By performing the rubbing processing in the directions shown in FIG. 27, the molecules Ma and Mb are oriented so as to be symmetrical with respect to the partition member 267 as a reference. That is, there is a mirror image relationship between the molecule Ma in the liquid crystal layer 260a and the molecule Mb in the liquid crystal layer 260b. The molecule Mc is oriented in a direction perpendicular to the molecules Ma and Mb.

Figure 28:
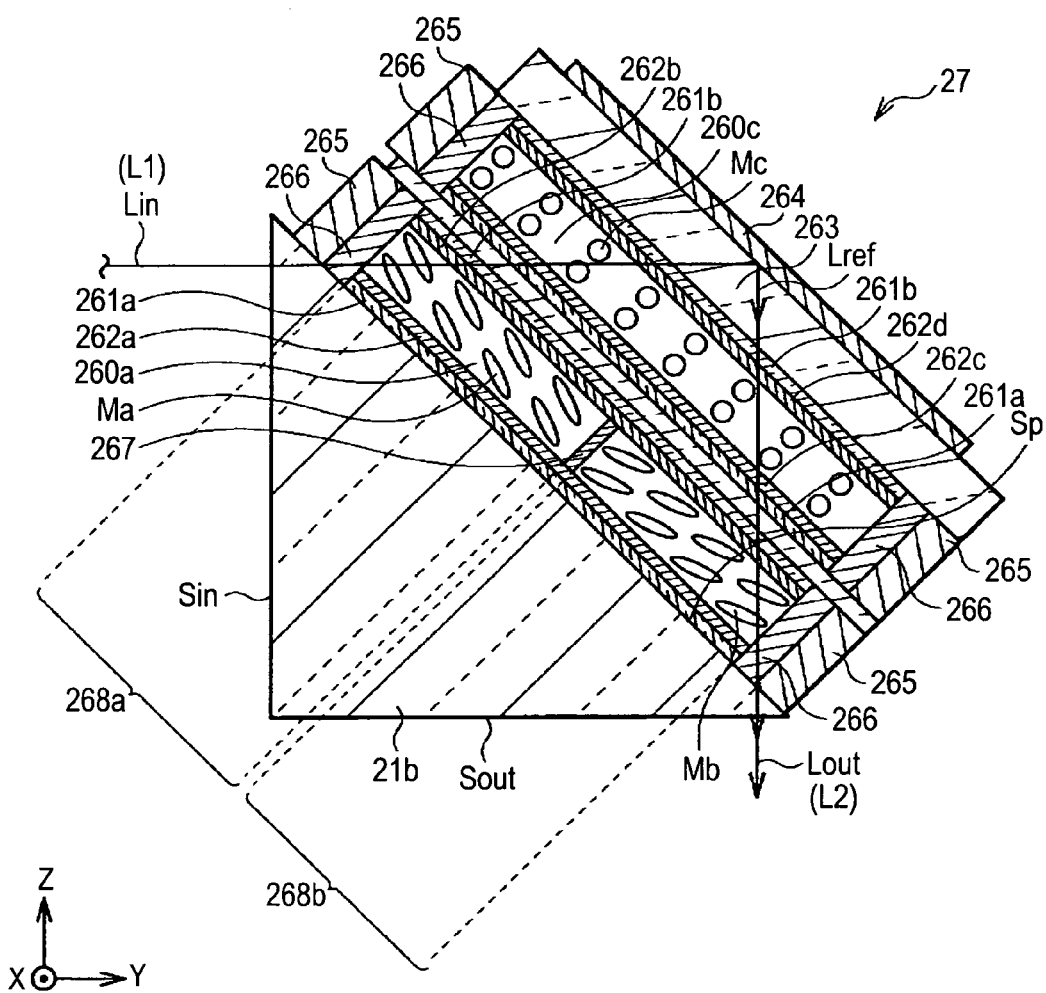
FIG. 28 is a sectional view showing examples of light incident on a reflective film and light reflected from the reflective film which are shown in FIG. 26.

Also in the liquid crystal light adjusting device 27 according to the present embodiment, it is possible to perform the same light adjusting operation as in the liquid crystal light adjusting device 26. That is, as shown in FIG. 28, imaging light (incident light Lin) incident from the incidence surface Sin of the prism 21b is transmitted through the liquid crystal layers 260a and 260c and the like through the prism 21b and is then reflected by the reflective film 264. Then, the reflected light Lref is transmitted through the liquid crystal layers 260c and 260b and the like and is emitted from the emission surface Sout of the prism 21b as emitted light Lout. In addition, when driving voltages (applied voltages) of the liquid crystal layers 260 and 260c are different, it is also possible to maintain the fixed amount of light while intentionally weakening the polarization (polarized component) of imaging light in a specific direction.

Meanwhile, since two layers of the liquid crystal layers 260 and 260c are laminated in the liquid crystal light adjusting device 27 as described above, the following effects are also obtained. That is, first, it is generally known that the light adjustment range in a liquid crystal light adjusting device is limited to some extent since there is a limitation in the kind of coloring matter dissolved in liquid crystal as a host or the amount of dissolution in the case of guest-host liquid crystal. Here, when guest-host liquid crystal with certain fixed concentration is used, it is possible to increase a light adjustment range by increasing a cell gap of a liquid crystal layer (by increasing the thickness). However, an increase in the cell gap has an adverse effect on the response speed of liquid crystal (response speed of liquid crystal decreases). Then, in order to increase the light adjustment range, it may be considered to use a polarizing plate. However, if the polarizing plate is fixed (polarization axis is fixed), the F value of a lens in an imaging apparatus is reduced when the liquid crystal light adjusting device is applied to the imaging apparatus. For this reason, it is practical to provide a polarizing plate on the optical path so as to be removable (detachable). However, if the polarizing plate with such a configuration is used together, it becomes difficult to make a lens barrel device (eventually, the imaging apparatus) thin.

In contrast, since the liquid crystal light adjusting device 27 in this modification has the above-described two-layer structure with the liquid crystal layers 260 and 260c, it is possible to increase the light adjustment range while maintaining (not changing) the cell gap (thickness) of the liquid crystal layer itself and also maintaining (not reducing) the response speed of liquid crystal.

Figure 29:
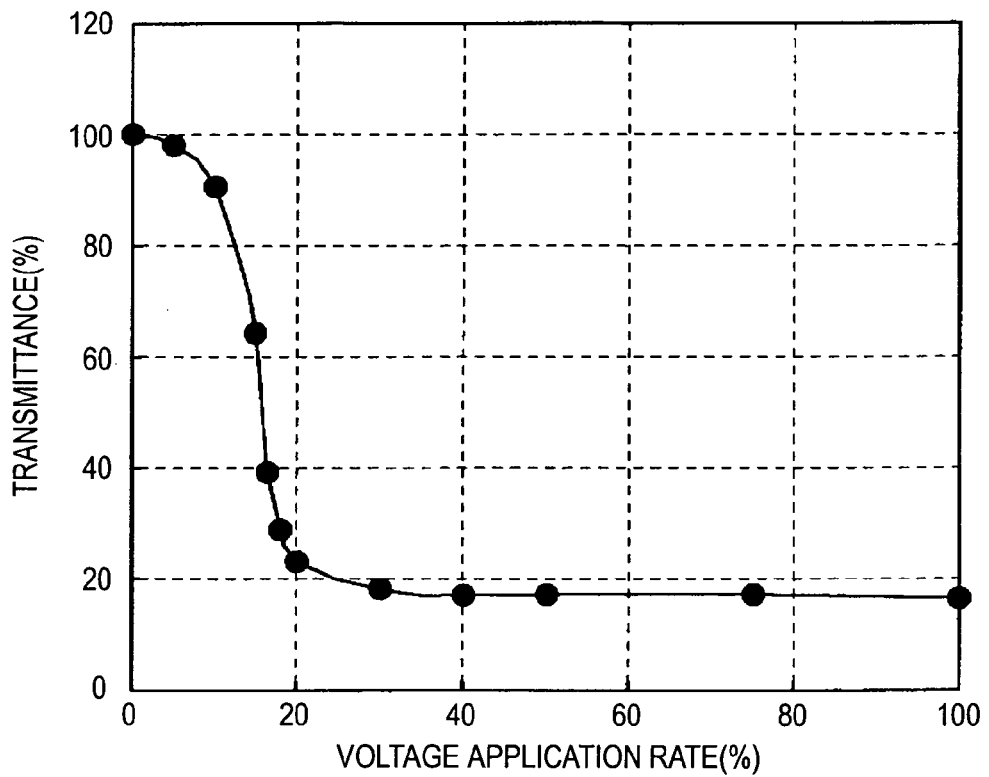
FIG. 29 is a characteristic view showing an example of the relationship between the voltage application rate and the transmittance in the liquid crystal light adjusting device shown in FIG. 26.

FIG. 29 shows an example of the relationship between the voltage application rate and the transmittance in the liquid crystal light adjusting device 27 as in FIG. 20 in the first embodiment. From FIG. 29, it can be seen that the transmittance converges on about 20% or less (almost constant value) when the voltage application rate is about 40% in the present embodiment. That is, in this example, the light adjustment range in the liquid crystal light adjusting device 27 is about 80% (range of the transmittance of 20% to 100%). Accordingly, it can be seen that the light adjustment range is further extended compared with that in the liquid crystal light adjusting device 26 shown in FIG. 20.

As described above, in the liquid crystal light adjusting device 27 according to the second embodiment, it becomes possible to further extend the light adjustment range of the liquid crystal light adjusting device 27 by forming the liquid crystal layer in a two-layer structure with the liquid crystal layers 260 and 260c in addition to providing the alignment regions 268a and 268b with different orientation directions of liquid crystal molecules.

In addition, although the case where the liquid crystal layer has a two-layer structure has been described in the present embodiment, a liquid crystal layer in a liquid crystal light adjusting device may have a laminated structure of three or more layers without being limited to the above case.

In addition, although the direction of rubbing processing on the alignment films 262a, 262b, 262c, and 262d is not limited, the light adjustment range can be extended especially when the direction of rubbing processing on the alignment films 262a and 262b which control the orientation direction of the liquid crystal layer 260 is perpendicular to the direction of rubbing processing on the alignment films 262c and 262d which control the orientation direction of the liquid crystal layer 260c. Although the rubbing processing on the alignment films 262a and 262b is performed in the same direction as in the liquid crystal light adjusting device 26 according to the first embodiment, the rubbing processing on the alignment films 262a and 262b may be performed in the same direction as in the liquid crystal light adjusting device 26A in the modification described above.

[Other Modifications]

While the present disclosure has been described with respect to the embodiments and the modifications, the present disclosure is not limited to these embodiments and the like and various modifications may be made.

Figure 30:
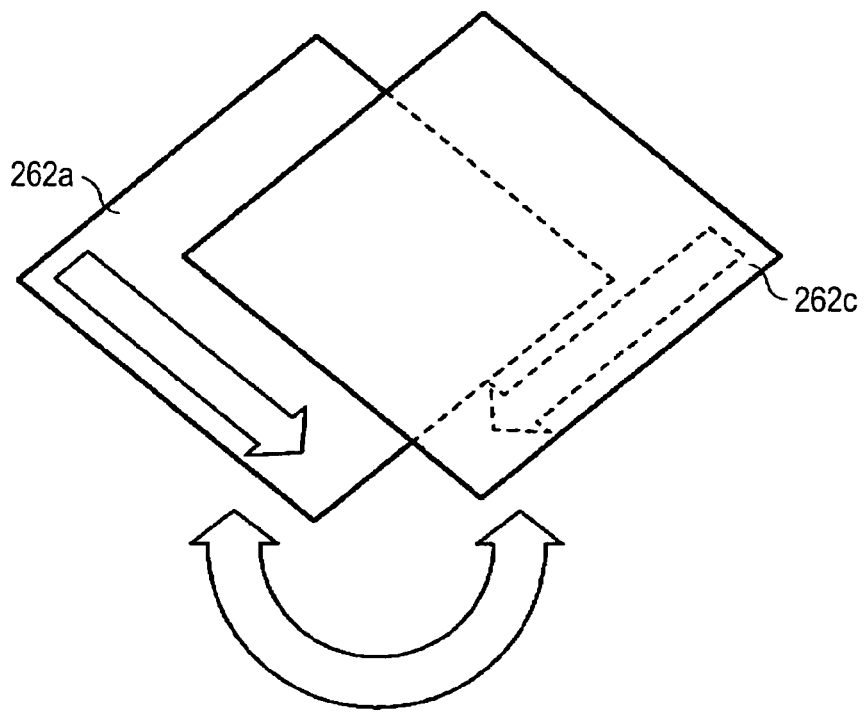

For example, although the direction of rubbing processing is parallel or perpendicular to the tilt direction of the mounting surface Sp of the prism 21b in the embodiment described above, rubbing processing may also be performed obliquely with respect to the tilt direction. In addition, although rubbing processing on the opposite alignment films has been performed in the anti-parallel direction in the embodiment described above, rubbing processing on the opposite alignment films may also be performed in the same direction. Alternatively, as shown in FIG. 30, rubbing processing on one of alignment films may be performed in a direction rotated by 90° (270°) from the other alignment film. In addition, in order to control the orientation direction of a liquid crystal molecule, an additive may be added to host liquid crystal to adjust the rotation angle of a liquid crystal molecule.

Figure 31:
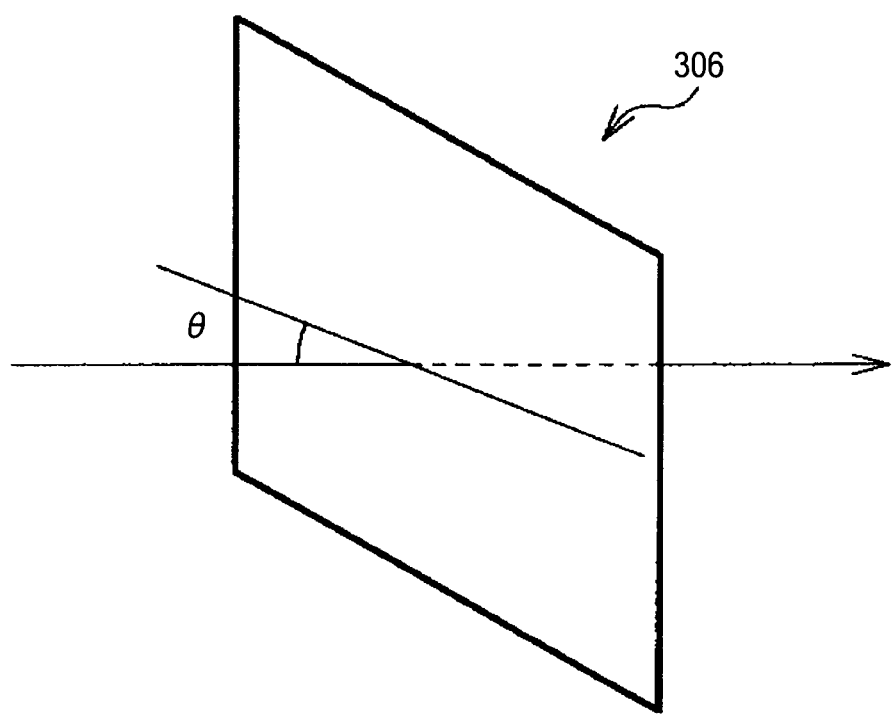
FIG. 31 is a view for explaining a method of studying the orientation direction of a liquid crystal molecule.

When designing the combination of orientation directions (directions of rubbing processing) of liquid crystal molecules as described above, first, a study is made using a liquid crystal cell in which the orientation directions of all liquid crystal molecules are the same (a substrate, a transparent electrode, an alignment film, and a liquid crystal layer), for example. As shown in FIG. 31, light is incident on a liquid crystal cell 306 from a direction of an angle θ equivalent to the angle of incidence of light on a liquid crystal light adjusting device with respect to a substrate of the liquid crystal cell 306, for example, from a direction of 45°, and a transmittance change in the liquid crystal cell 306 according to the voltage application rate is measured. By repeating such study, the orientation directions of liquid crystal molecules in which a desired light adjustment range is obtained are designed.

In addition, although the liquid crystal light adjusting device using guest-host liquid crystal has been described, as an example in the above embodiment and the like, it is also possible to use a liquid crystal light adjusting device using liquid crystal other than the guest-host liquid crystal without being limited to this case.

In addition, although the case where a prism is disposed in a bending region within a lens barrel device has been described in the above embodiment and the like, optical components (for example, a mirror and the like) other than the prism may also be disposed in a bending region within the lens barrel device depending on the case.

In addition, although each component (optical system), such as a lens barrel device or an imaging apparatus, is specifically mentioned in the above embodiment and the like, it is not necessary to provide all of the components described above, and other components may be further provided. In addition, although the digital still camera has been illustrated as an imaging apparatus in the above embodiment and the like, the present disclosure may also be applied to various kinds of apparatuses with light adjusting devices, such as imaging apparatuses involving video cameras and television cameras, light valves, reflective display devices, or optical switch devices.

The present disclosure contains subject matter related to that disclosed in Japanese Priority Patent Application JP 2010-243257 filed in the Japan Patent Office on Oct. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal light adjusting device comprising:
a first liquid crystal layer on which light from a first lens is incident; and
a reflective film which reflects light transmitted through the first liquid crystal layer to a second lens,
wherein the first liquid crystal layer has adjacent alignment regions, and orientation directions of liquid crystal molecules in the adjacent alignment regions are different; and
wherein the light from the first lens passes through a first alignment region of the liquid crystal layer and is reflected by the reflective film through a second alignment region adjacent the first alignment region in the liquid crystal layer to the second lens.

2. The liquid crystal light adjusting device according to claim 1,
wherein in the adjacent alignment regions, the orientation directions of liquid crystal molecules are symmetrical with respect to a boundary of the adjacent alignment regions as a reference.

3. The liquid crystal light adjusting device according to claim 1,
wherein first and second alignment films are provided on a first surface and a second surface of the first liquid crystal layer, respectively, and
in the first alignment film, rubbing processing is performed in different directions in regions corresponding to the adjacent alignment regions.

4. The liquid crystal light adjusting device according to claim 3,
wherein a first direction and a second direction of the rubbing processing performed on the first alignment film are symmetrical with respect to a boundary of the adjacent alignment regions as a reference and are toward the boundary.

5. The liquid crystal light adjusting device according to claim 4,
wherein a first direction and a second direction of the rubbing processing performed on the second alignment film are anti-parallel to the first direction and the second direction of the rubbing processing on the first alignment film, respectively.

6. The liquid crystal light adjusting device according to claim 1,
wherein a substrate is provided between the first liquid crystal layer and the reflective film, and a prism is provided at a surface side of the first liquid crystal layer.

7. The liquid crystal light adjusting device according to claim 1,
wherein a second liquid crystal layer is provided between the first liquid crystal layer and the reflective film.

8. The liquid crystal light adjusting device according to claim 7,
wherein in the second liquid crystal layer, liquid crystal molecules are oriented in one orientation direction.

9. The liquid crystal light adjusting device according to claim 1,
wherein a partition member is provided at a boundary between the adjacent alignment regions.

10. The liquid crystal light adjusting device according to claim 1,
wherein the first liquid crystal layer is formed using guest-host (GH) liquid crystal containing a dichroic coloring matter.

11. The liquid crystal light adjusting device according to claim 1,
wherein orientation directions of liquid crystal molecules in alignment regions through which light, which is incident on the first liquid crystal layer from the first lens, and light, which is reflected by the reflective film and is emitted to the second lens, are transmitted are different at least partially.

12. An imaging apparatus comprising:
a liquid crystal light adjusting device; and
an imaging device,
wherein the liquid crystal light adjusting device includes
a first liquid crystal layer on which light from a first lens is incident, and
a reflective film which reflects light transmitted through the first liquid crystal layer to a second lens,
the first liquid crystal layer has adjacent alignment regions, and orientation directions of liquid crystal molecules in the adjacent alignment regions are different, and
the light from the first lens passes through a first alignment region of the liquid crystal layer and is reflected by the reflective film through a second alignment region adjacent the first alignment region in the liquid crystal layer to the second lens.

13. The imaging apparatus according to claim 12,
wherein in the adjacent alignment regions, the orientation directions of liquid crystal molecules are symmetrical with respect to a boundary of the adjacent alignment regions as a reference.

14. The imaging apparatus according to claim 12,
wherein first and second alignment films are provided on a first surface and a second surface of the first liquid crystal layer, respectively, and
in the first alignment film, rubbing processing is performed in different directions in regions corresponding to the adjacent alignment regions.

15. The imaging apparatus according to claim 14,
wherein a first direction and a second direction of the rubbing processing performed on the first alignment film are symmetrical with respect to a boundary of the adjacent alignment regions as a reference and are toward the boundary.

16. The imaging apparatus according to claim 15,
wherein a first direction and a second direction of the rubbing processing performed on the second alignment film are anti-parallel to the first direction and the second direction of the rubbing processing on the first alignment film, respectively.

17. The imaging apparatus according to claim 12,
wherein a substrate is provided between the first liquid crystal layer and the reflective film, and a prism is provided at a surface side of the first liquid crystal layer.

18. The imaging apparatus according to claim 12,
wherein a second liquid crystal layer is provided between the first liquid crystal layer and the reflective film.

19. The imaging apparatus according to claim 18,
wherein in the second liquid crystal layer, liquid crystal molecules are oriented in one orientation direction.

20. The imaging apparatus according to claim 12,
wherein a partition member is provided at a boundary between the adjacent alignment regions.

21. The imaging apparatus according to claim 12,
wherein the first liquid crystal layer is formed using guest-host (GH) liquid crystal containing a dichroic coloring matter.

22. The imaging apparatus according to claim 12,
wherein orientation directions of liquid crystal molecules in alignment regions through which light, which is incident on the first liquid crystal layer from the first lens, and light, which is reflected by the reflective film and is emitted to the second lens, are transmitted are different at least partially.

* * * * *